US 7,223,427 B2

(12) United States Patent
Knepler

(10) Patent No.: US 7,223,427 B2
(45) Date of Patent: *May 29, 2007

(54) BEVERAGE MAKER INTERFACE

(75) Inventor: John T. Knepler, Springfield, IL (US)

(73) Assignee: Bunn-O-Matic Corporation, Springfield, IL (US)

(*) Notice: Subject to any disclaimer, the term of this patent is extended or adjusted under 35 U.S.C. 154(b) by 788 days.

This patent is subject to a terminal disclaimer.

(21) Appl. No.: 10/271,619

(22) Filed: Oct. 14, 2002

(65) Prior Publication Data

US 2003/0129286 A1    Jul. 10, 2003

Related U.S. Application Data

(63) Continuation-in-part of application No. 09/550,470, filed on Apr. 14, 2000, now Pat. No. 6,479,086, which is a continuation-in-part of application No. 09/472,367, filed on Dec. 23, 1999, now Pat. No. 6,465,035, which is a continuation-in-part of application No. 09/337,102, filed on Jun. 21, 1999, now Pat. No. 6,238,721.

(51) Int. Cl.
    *A23L 2/00*      (2006.01)
    *G01N 33/02*     (2006.01)

(52) U.S. Cl. .................. 426/231; 99/280; 99/289 R; 99/323; 141/94; 141/192; 426/433; 426/590

(58) Field of Classification Search ............. 426/231, 426/433, 435, 590; 99/280, 282, 283, 285, 99/289 R, 323; 141/94, 192, 198
    See application file for complete search history.

(56) References Cited

U.S. PATENT DOCUMENTS 3,423,209 A    1/1969    Weber .................. 99/71
4,468,406 A    8/1984    d'Alayer
                         de Costemore d'Arc ... 426/231
5,072,660 A   12/1991    Helbling ................ 99/280
5,094,153 A    3/1992    Helbling ................ 99/280
5,158,793 A   10/1992    Helbling ............... 426/231
5,186,399 A    2/1993    Knepler et al. .......... 241/34
5,375,508 A   12/1994    Knepler et al. .......... 99/280
5,417,145 A    5/1995    Joseph, Jr. et al. ....... 99/280
5,511,465 A    4/1996    Friedrich et al. ......... 99/286
5,542,342 A    8/1996    McNeill et al. .......... 99/280
5,568,763 A   10/1996    Kunzler ................ 99/280
5,724,882 A    3/1998    Gallas et al. ........... 99/285
5,858,437 A    1/1999    Anson ................. 426/431
5,875,703 A *  3/1999    Rolfes ................. 99/283
6,067,894 A    5/2000    Eugster ................ 99/285
6,142,063 A * 11/2000    Beaulieu et al. ......... 99/283
6,238,721 B1   5/2001    Knepler ............... 426/590
6,479,086 B1  11/2002    Knepler ............... 426/231

FOREIGN PATENT DOCUMENTS

EP            0 922 425 A1    12/1997

OTHER PUBLICATIONS

Optek Technology, Inc., Product Bulletin OHN3506/3507, Ratiometric Linear Hall Effect Sensor, Aug. 1996.

(Continued)

*Primary Examiner*—George C. Yeung
(74) *Attorney, Agent, or Firm*—Barnes & Thornburg LLP

(57) ABSTRACT

The present disclosure relates to a system and method of use for storing and communicating information such as beverage preparation parameters including but not limited to beverage recipes, advertisements or operator information. The present disclosure provides a system which stores the information, communicates the information, and when appropriate, displays the information. The present disclosure also includes a method of using the described system. This disclosure provides a storage device which provides beverage brewing parameters used in beverage preparation.

48 Claims, 12 Drawing Sheets

OTHER PUBLICATIONS

Dallas Semiconductor DS1971 256-Bit EEPROM iButton™ pp. 1-3 082299.

Dallas Semiconductor DS193 4K-Bit EEPROM iButton™ pp. 1-2 062498 ½.

Dallas Semiconductor A Personal Touch for the Information Age pp. 1-3.

TEMIC Semiconductors TK5550 Read/Write Transponder, TELEFUNKEN Semiconductor4s Rev. A1, Apr. 30, 1997, pp. 204, 205 and 311.

TEMIC Semiconductors Identification Systems, TELEFUNKEN Semiconductors 08.97, pp. 225-228.

International Search Report for PCT/US2003/32680, Completed: Oct. 19, 2004, Title: Beverage Maker Interface, filed: Oct. 14, 2002.

* cited by examiner

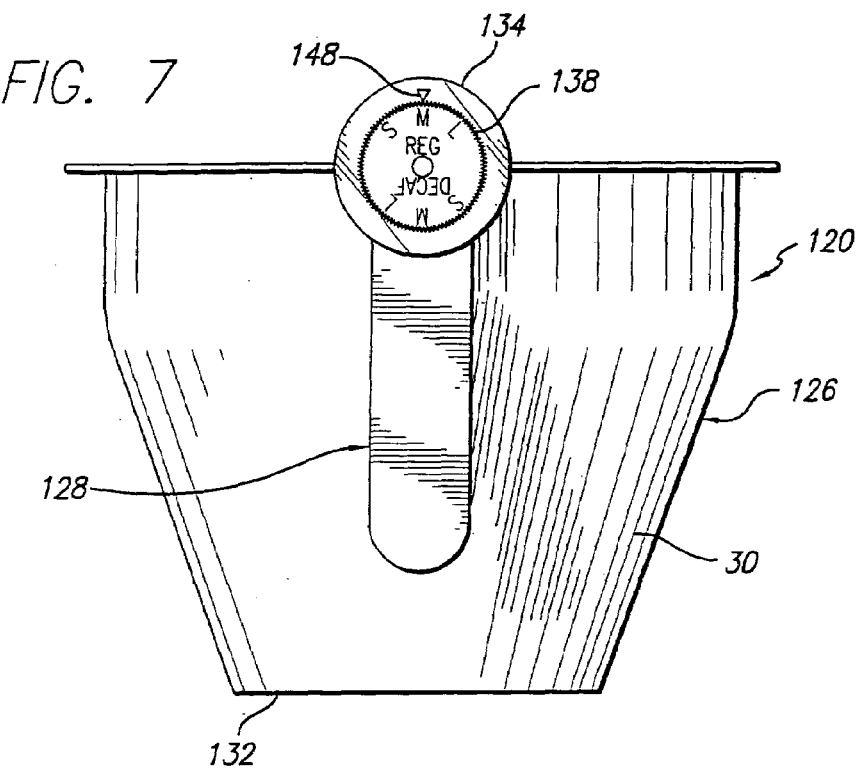
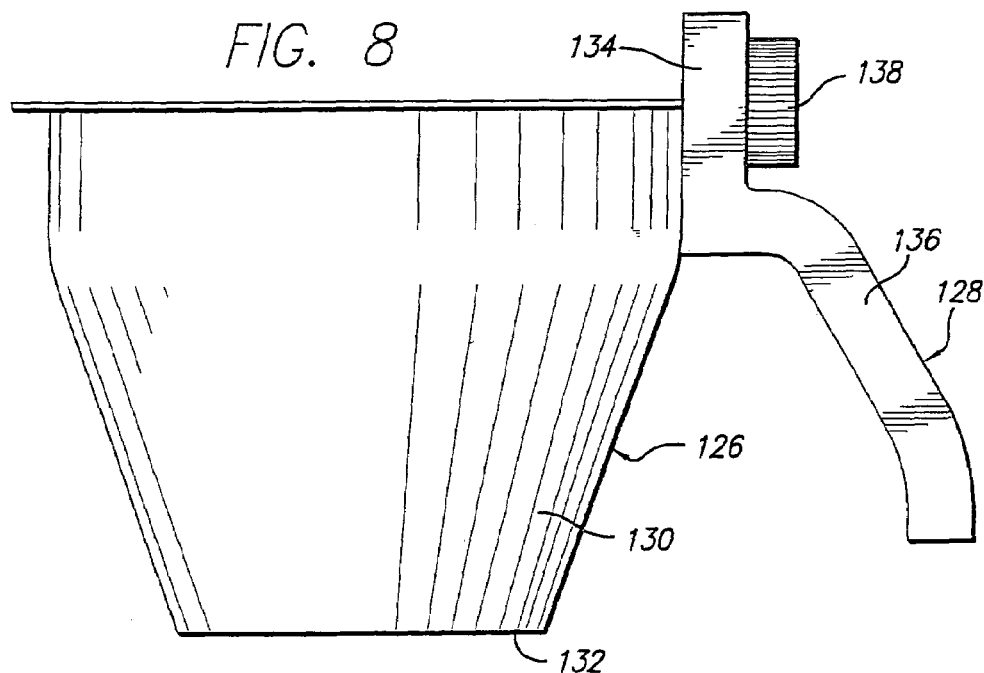

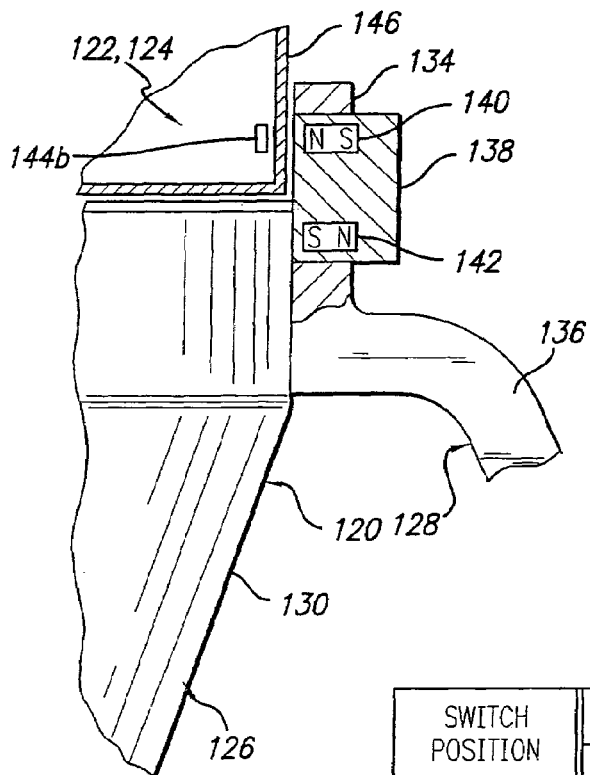
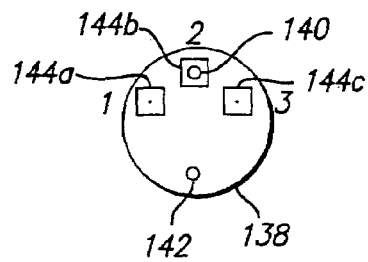
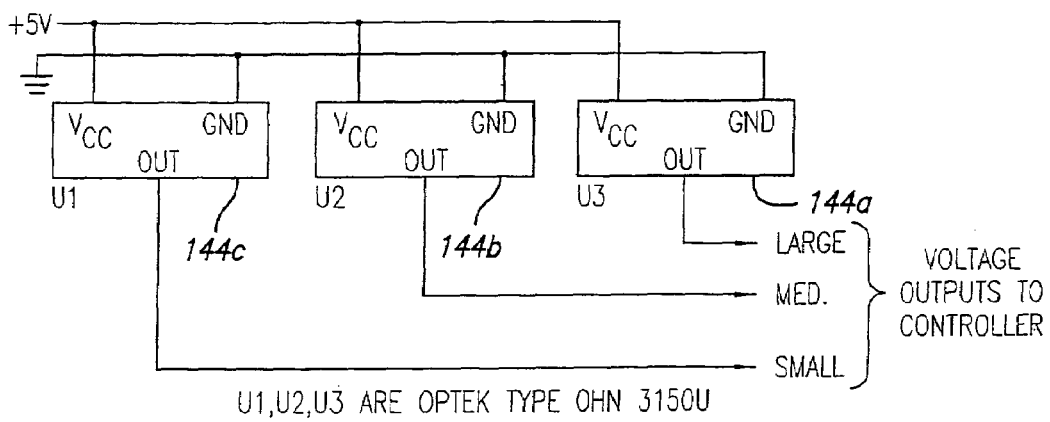

| | SWITCH-POSITION | | SENSOR | | | |
|---|---|---|---|---|---|---|
| | | | 1 | 2 | 3 | 4 |
| R E G U L A R | SMALL | 1 | + | 0 | 0 | 0 |
| | MEDIUM | 2 | 0 | + | 0 | 0 |
| | LARGE | 3 | − | 0 | + | 0 |
| D E C A F | SMALL | 4 | 0 | − | 0 | + |
| | MEDIUM | 5 | 0 | 0 | − | 0 |
| | LARGE | 6 | 0 | 0 | 0 | − |

0 = VOLTAGE WITH NO MAGNET

− NEGATIVE GOING

+ POSITIVE GOING

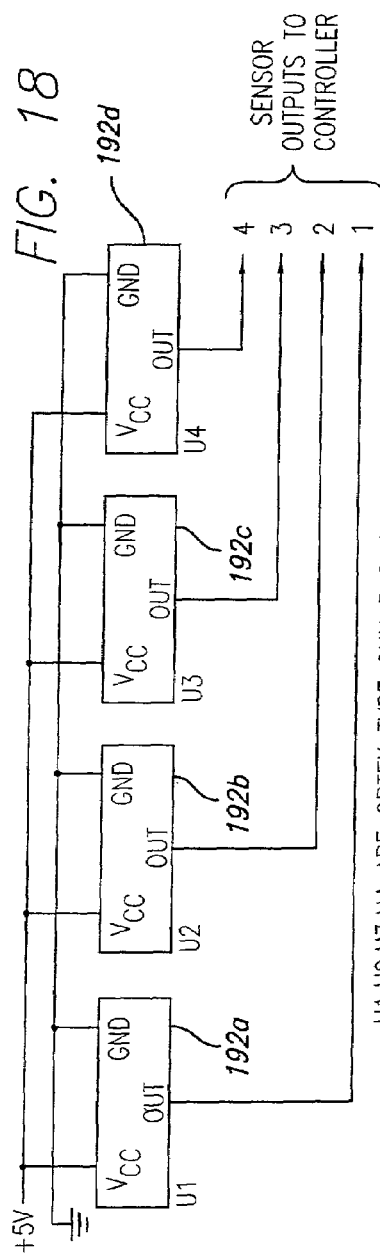
FIG. 18
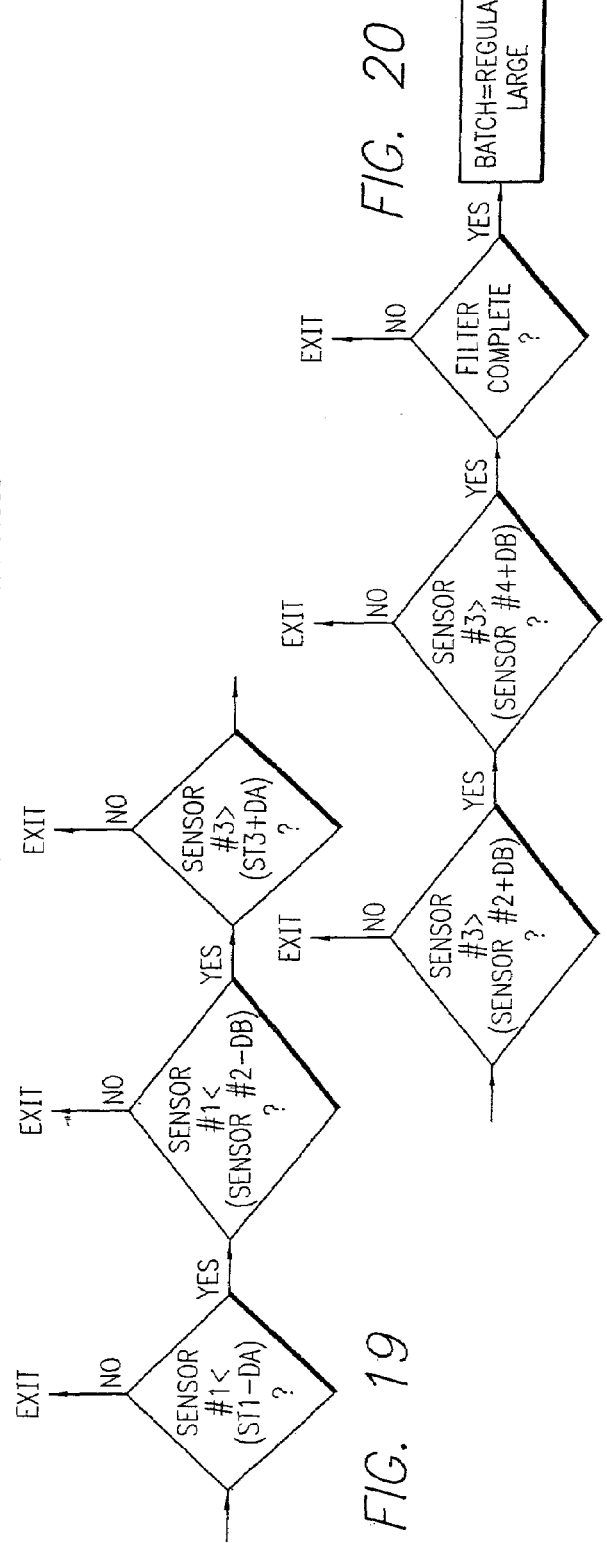
FIG. 19
FIG. 20

BEVERAGE MAKER INTERFACE

CROSS-REFERENCE TO RELATED APPLICATIONS

This application claims priority from and is a continuation-in-part of U.S. patent application Ser. No. 09/550,470, filed Apr. 14, 2000, now U.S. Pat. No. 6,479,086, which is a continuation-in-part of U.S. patent application Ser. No. 09/472,367, filed Dec. 23, 1999, now U.S. Pat. No. 6,465,035, which is a continuation-in-part of U.S. Pat. application Ser. No. 09/337,102, filed Jun. 21, 1999, now U.S. Pat. No. 6,238,721, issued May 29, 2001, all of the foregoing being assigned to the assignee of the present disclosure and all of which are expressly incorporated herein by reference.

BACKGROUND

This disclosure generally relates to a beverage preparation system and method of use. Particularly, the present disclosure envisions a beverage preparation system and method of use including a beverage maker interface which utilizes a storage device for storing information, such as beverage preparation parameters, including but not limited to a beverage recipe, and a communication device for one or two way communication with the storage device, such as reading the recipe or transferring recipe updates. Reference to beverage recipe in these examples includes the various parameters used in preparing a beverage.

In one example, the present disclosure envisions a beverage brewer which utilizes heated water to infuse a beverage brewing substance. The communication device coupled to the brewer receives recipe information from the storage device and transmits recipe information to the brewer to provide control of the brewer relating to the specific beverage brewing substance used in the brewing process.

By way of background, a variety of beverage brewing devices have been developed to control the parameters associated with the brewing process. Such devices include those manufactured by Bunn-O-Matic Corporation, the assignee of the present disclosure. For example, in U.S. Pat. No. 5,375,508 issued Dec. 27, 1994 to the assignee of the present application, a control system is provided for use with a beverage brewing apparatus. The control system is programmable to control numerous adjustable functions associated with the brewer. The control system stores at least one function limit for each of the functions which it controls. As such, it is generally known to provide programmable control of beverage brewing parameters and user control of such parameters.

U.S. Pat. No. 5,375,508 also considers and discloses ways to prevent or prohibit unauthorized parties from utilizing the controls. One of the embodiments is shown in the form of a detachable programmable module which physically removes the control from the brewer. Another version of a limited control, contemplated by this patent, is to functionally disconnect, as with the removable module, the control function to prevent unintended parties from utilizing the control function. By using a pass code or limited control function with a module attached to the brewer, the input device and its control functions are separated from selectively modifying the control circuits. The input device may be a control panel associated with the brewer, although not detachable from the brewer, but requiring a pass code to have access thereto. Such a control panel would act as a separate input device as a result of the functions providing separate functions from the brewing device.

Another embodiment of this disclosure is generally directed to a beverage substance dispenser, beverage maker or brewer and funnel interface and its method of use. More particularly, the disclosure contemplates an interface which utilizes a funnel which can be mounted on either a brewing substance dispenser, such as a coffee grinder, or a beverage maker, such as a coffee brewer, to communicate information regarding beverage batch size and/or type of beverage from the brewing substance dispenser to the beverage maker.

U.S. Pat. No. 5,186,399, which is assigned to the same assignee as the present application, describes a system of connecting a multiple batch size brewer and a dual hopper grinder in order to coordinate the amount of ground coffee with the selected brewing volume. This system might not be explicit regarding setting the switches on the coffee grinder and on the coffee brewer to achieve the desired results and confusion may result. This confusion may occur if the user is preoccupied or busy. Also, this system is complicated when a dual head coffee brewer is used with a dual hopper coffee grinder, and when a single coffee grinder services more than one coffee brewer. In addition, the grinding operation is generally much faster than a brewing cycle (seconds versus minutes). Consequently, it is feasible for one coffee grinder to service several coffee brewers. Due to the complexity and expense of the switching and interconnect cables, however, a maximum of two coffee brewers are used with the system disclosed in U.S. Pat. No. 5,186,399.

The parent and grandparent applications, U.S. patent applications Ser. Nos. 09/472,367 and 09/337,102, which are assigned to the same assignee as the present application, disclose a wireless grinder-brewer interface and its method of use. A selector on the funnel is set by a user to select beverage batch size and type. This information is wirelessly communicated to the grinder and to the brewer when the funnel is mounted thereon. When this type of system is used, it is possible for a user to unintentionally move the selector when the funnel is being moved from the grinder to the brewer, such that the information communicated to the brewer is incorrect.

The present disclosure provides an interface and method which overcomes the limitations found in the system disclosed in U.S. Pat. No. 5,186,399 and in the parent and grandparent applications, U.S. patent applications Ser. Nos. 09/472,367 and 09/337,102. Other features and advantages will become apparent upon a reading of the following specification, in combination with a study of the drawings.

SUMMARY

This description provides a storage device which provides a set of beverage brewing parameters used in beverage preparation such as recipe. As such, the present disclosure relates to a system and method of use for storing and communicating information such as beverage preparation parameters including but not limited to a beverage recipe, advertisements or operator information. The present disclosure provides a system which stores the information, communicates the information, and when appropriate, displays the information. The present disclosure also includes a method of using the described system.

This disclosure provides a brewing substance dispenser, beverage maker and funnel interface and its method of use.

Also disclosed is a brewing substance dispenser, beverage maker and funnel interface which utilizes a funnel which can be mounted on the brewing substance dispenser and the beverage maker to communicate information regarding beverage batch size and/or type from the brewing substance dispenser to the beverage maker.

Further disclosed is an interface and method of use for use with a brewing substance dispenser and a beverage maker to communicate information regarding batch size and/or type of a beverage to be brewed.

An embodiment disclosed includes an interface for a brewing substance dispenser, a beverage maker and a funnel and its method of use. The brewing substance dispenser has means therein for storing and transmitting information and a user interface coupled thereto. The funnel includes a body and a memory device therein. The beverage maker includes means for reading the memory device of the funnel. When the funnel is mounted on the brewing substance dispenser, the means in the brewing substance dispenser and the memory device of the funnel are in communication with each other so that information input into the beverage maker by a user is transmitted to the funnel. Thereafter, when the funnel is mounted on the beverage maker, the structure in the beverage maker and the memory device of the funnel are in communication with each other and the structure in the beverage maker reads the information stored in the memory device of the funnel so that the desired beverage can be brewed.

Another embodiment disclosed includes a funnel having a selector thereon which can be set by a user to indicate a desired beverage batch size and/or type. Sensors on an associated dispenser, such as a coffee grinder, and on an associated beverage maker, such as a coffee brewer, are capable of sensing the structure to dispense, such as by grinding, an appropriate amount of beverage, such as coffee, and to produce, such as by brewing, an appropriate amount of beverage, respectively, when the funnel is mounted thereon.

Additional features of the disclosure will become apparent to those skilled in the art upon consideration of the following detailed description of drawings exemplifying the disclosure as presently perceived.

BRIEF DESCRIPTION OF THE DRAWINGS

The organization and manner of the structure and operation of the disclosure, may be understood by reference to the following description, taken in connection with the accompanying drawings, wherein like reference numerals identify like elements in which:

FIG. 7 is a side elevational view of a funnel which incorporates the features of another embodiment of the disclosure;

FIG. 8 is a left side elevational view of the funnel shown in FIG. 7;

FIG. 9 is a partial fragmentary side elevational view of the funnel shown in FIG. 7, with a fragmentary portion of the funnel being shown in cross-section, and a cross-sectional view of a portion of a machine, such as a brewing substance dispenser or coffee grinder, or a beverage maker or coffee brewer, to which the funnel is attached;

FIG. 10 is a schematic view of the selector on the funnel of FIG. 7 and sensors in the associated machine;

FIG. 11 is an output chart showing voltages generated under various settings for the embodiment of FIGS. 7–10;

FIG. 12 is schematic diagram of the Hall effect sensor circuitry for the embodiment of FIGS. 7–10;

FIG. 18 is schematic diagram of the Hall effect sensor circuitry for the embodiment of FIGS. 11–16; and FIGS. 19 and 20 show a flow chart for detecting a large batch of regular coffee for the embodiment of FIGS. 11–16;

DETAILED DESCRIPTION

Figure 1:
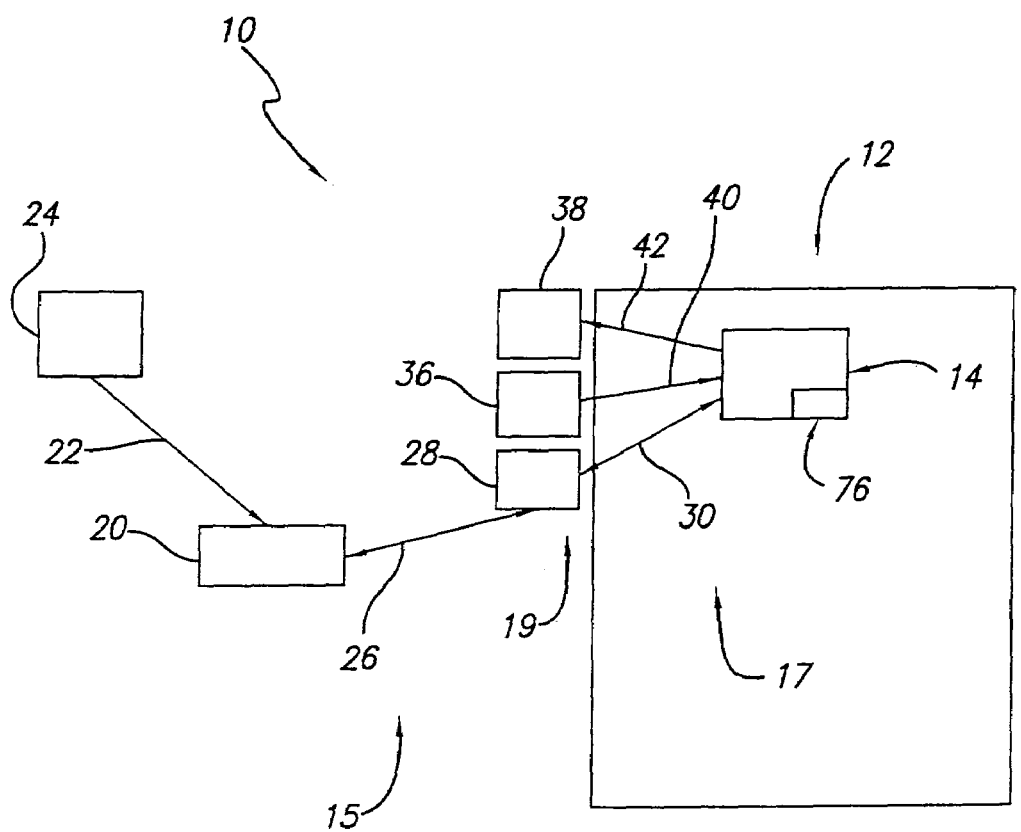
FIG. 1 is a diagrammatic illustration of the system and method as disclosed.

While the present disclosure may be susceptible to embodiment in different forms, there is shown in the drawings, and herein will be described in detail embodiments with the understanding that the present description is to be considered an exemplification of the principles of the disclosure and is not intended to limit the disclosure to that as illustrated and described herein.

Figure 2:
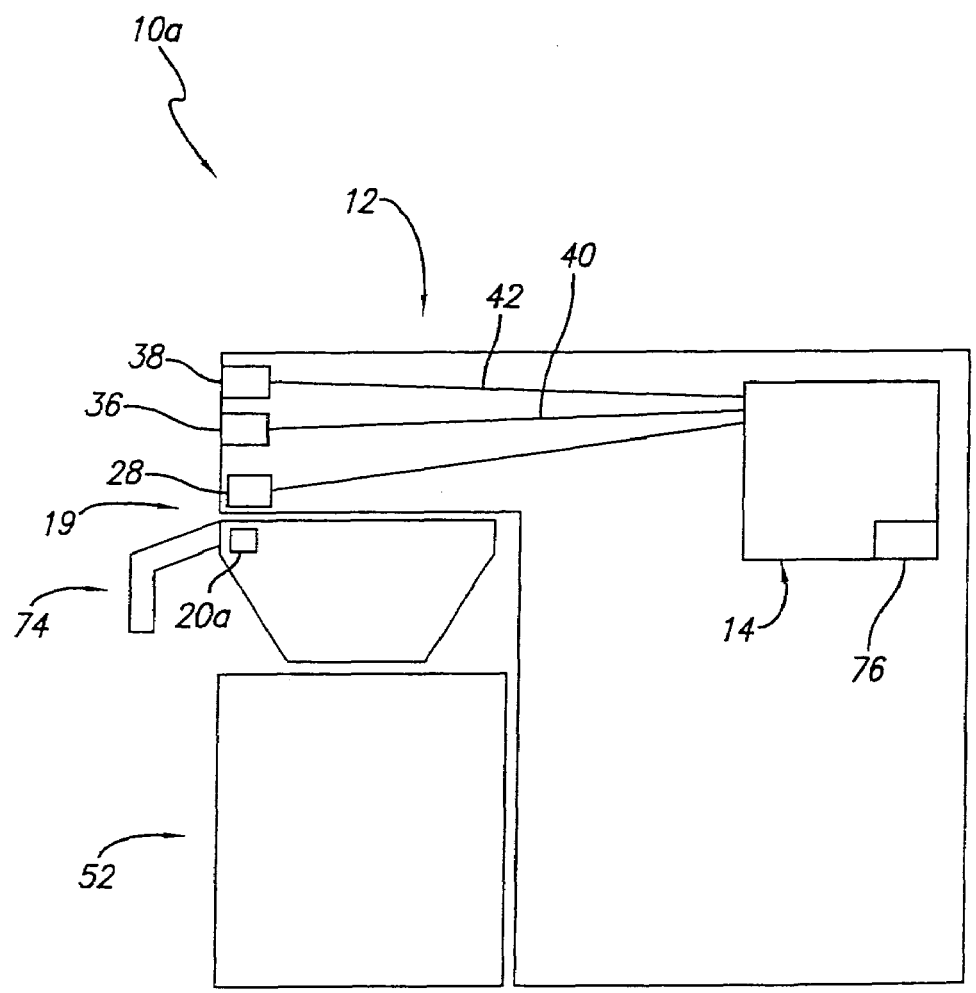
FIG. 2 is a is a diagrammatic illustration of an embodiment of the system as disclosed using a beverage brewing apparatus.

With reference to the figure, FIGS. 1 and 2 show diagrammatic illustrations of the system and method of use in the present disclosure. FIG. 1 shows an embodiment of a beverage preparation system 10 in a simplified diagrammatic form. FIG. 2 shows the system 10A in a form which incorporates additional specific components for carrying a parameter selector or selector in the form of a memory device or storage device 20 as used in the present disclosure for communicating information such as beverage preparation parameters. As will be described below, the storage device 20 is definable by a user to store thereon or define the information or preparation parameters.

With reference to FIG. 1, the system 10 includes a beverage preparation apparatus 12 for producing a beverage. The apparatus 12 has a control module or controller 14. The beverage preparation apparatus 12 may be in a form of beverage brewer or brewer or beverage reconstituting device for reconstituting a powdered or liquid concentrate. The system 10 includes an interface 15 which facilitates communication between an information storage device 20 and the apparatus 12. The storage device 20 provides one form of a parameter selector or selector which acts as a memory device as used in the present disclosure for communicating information such as beverage preparation parameters.

Terms including brewed, brewing, brewing substance, brewing liquid, beverage, and brewed beverage as used herein are intended to be broadly defined as including but not limited to the brewing of coffee, tea and any other brewed beverage. This broad interpretation is also intended to include, but is not limited to any process of dispensing, infusing, steeping, reconstituting, diluting, dissolving, saturating or passing a liquid through or otherwise mixing or combining a beverage substance with a preparation liquid such as water without a limitation to the temperature of such liquid unless specified. This broad interpretation is also intended to include, but is not limited to beverage substances such as ground coffee, tea, liquid beverage or food concentrates, powdered beverage or food concentrates, freeze dried coffee or other beverage or food concentrates, to obtain a desired beverage or other foods by way of example, but not limited to, soups and gravy. Preparation liquid is also intended to be broadly interpreted to include, but not be limited to, water, coffee, tea, milk based liquids, juices, concentrated forms of these liquids and other liquids and combinations of these liquids.

Generally, beverage brewers and reconstituting devices or dispensers are well known in the art such as produced by Bunn-O-Matic Corporation of Springfield, Ill. Bunn-O-Matic is the assignee of the present disclosure and provides a full line of beverage brewing and dispensing apparatus. For example, a brewer may include a brewing assembly which includes a funnel and other structures for holding ground coffee, tea or other substances for brewing. The substance is mixed with a liquid, such as water to infuse, mix or otherwise saturate the brewing substance for dispensing a beverage from the funnel. The dispensed beverage is retained in a carafe, dispenser or other container for serving. Alternatively, with an appropriately configured device, the beverage can be dispensed directly into a single or multiple serving container such as a cup. As such beverage brewing and dispensing apparatus are well known in the art. It is also known to have apparatus 12 which include a microprocessor and memory devices that are incorporated into or otherwise coupled to the controller 14 to control the operation of such a brewer or apparatus 12.

The controller 14 is coupled to the beverage preparation apparatus 12 to control various systems and devices within the apparatus to produce a beverage. For example, in a beverage preparation apparatus such devices include a temperature regulating device and a water dispensing device. The controller will activate and deactivate the temperature device in response to a thermostatic reading of the temperature of the water heating device. Further, the controller 14 can operate the flow of water into the apparatus for producing a beverage. An example of a water control device might include a controllable solenoid valve attached to a water inlet line such that the controller can be programmed to admit controlled quantities of water to the beverage preparation apparatus. A controller for controlling various beverage apparatus and devices can be found in many beverage preparation apparatus. An example of such a controller can be found in U.S. Pat. No. 5,375,508 issued Dec. 27, 1994 and assigned to the assignee of the present disclosure, which is expressly incorporated herein by reference in its entirety, and which shows a control system including a controller coupled to a beverage preparation apparatus.

The interface 15 of the system 10 of the present disclosure includes a storage device 20 and a communication device 28. The communication device 28, either alone or in combination with the controller 14 define one form of means 19 for reading the memory device 20. The storage device 20 may be in the form of a discrete component such as an electrical device, a transponder chip, bar code, label with a code or card, magnetic strip, or other information storage device 20. Generally, the storage device 20 is programmed via a communication link 22 by a programming device 24 which transfers the programmed information 22 to the storage device 20. The transfer of the information 22 may occur in any appropriate form of communication link using wireless electrical, a contact electrical, wireless optical, magnetic, conductive, inductive or other information communication form or manual entry device. It should be noted that the communication link may be in any one of a variety of forms such as hardwired physical point-to-point link, optical lines, light wave, RF, acoustic, ultrasonic, infrared or any other form of communication link between one or more devices.

Generally, the programming device 24 is matched to the storage device 20 so that the information 22 is suitably communicated to the storage device 20.

The storage device 20 is used to carry transferable information which it transmits or otherwise communicates 26 with the corresponding communication device 28. The communication device 28 receives or reads the transferable information from the storage device 20. Communication link 26 between the storage device 20 and communication device 28 may be by way of a suitably corresponding wireless electrical, wireless optical, magnetic, conductive, inductive or other communication link or path 26. Communication device 28 receives information from the storage device 20. Communication device 28 is coupled via link 30 to the controller 14 to allow the information 30 transferred from the communication device 28 to the controller at 14 used to control the apparatus 12. Link 30 may be any suitable communication link including wired or wireless for example, conductive wire, optical fiber, RF, infrared, magnetic, or other communication media.

The storage device 20 is generally separate from the beverage preparation apparatus. In this regard, it is generally an independent device which is positioned in close proximity to the communication device 28 to transmit the transferable information to the communication device. Generally, the storage device 20 and the communication device 28 need to be compatible such that the form of transferable information on the storage device 20 can be read or otherwise received by the communication device 20. With the communication device 28 being coupled 30 to the controller 14 the transferable information can be transmitted from the communication device and controller 14. The storage device 20 may be in the form of an electrical device or a non-electrical device storing the transferable information in an appropriate form. For example, when the storage device 20 is an electrical device, the communication device 28 can be capable of interfacing and providing an appropriate electrical device reader receiving and transmitting the transferable information from the storage device 20 to the controller 14.

The storage device 20 and communication device 28 in the form of electrical devices may rely on conductive coupling as well as inductive coupling for communicating the transferable information from the storage device 20 to the controller 14. The storage device 20 can also take the form of an active or passive transponder component storing the transferable information with the communication device 28 being suitable transponder component reader for receiving and transmitting the transferable information from the storage device 20 to the controller 14. The storage device 20 and communication device 28 can also take the form of magnetic information transmittal. In this regard, the storage device can include a magnetic strip or other magnetic media which is then read by a suitable magnetic device reader receiving and transmitting the transferable information from the storage device to the controller.

As will be described in greater detail herein below, the storage device 20 may also include an optically read bar code or other code for automated or manual reading by the communication device 20. In the embodiment employing a bar code, a bar code is provided on the storage device for storing the transferable information in printed form. The printed form may be generally two dimensional as in printing on a substrate as well as three dimensional such as molded or otherwise formed into a surface. In this embodiment, the communication device 28 is in the form of a bar code reader which is suitable for reading any of the forms of bar code which might be used to store the transferable information. Reference to the bar code can be found with reference to FIG. 5.

The transferable information 22, 26, 30 generally relates to beverage preparation parameters and information for control of the apparatus 12. Such transferable information may relate to one or more of beverage preparation parameter information, non-beverage information, and beverage information. For example using a brewer for apparatus 12, such beverage preparation parameter information may include, but are not limited to, the volume of water to be dispensed over the beverage brewing substance, the required temperature of the water dispensed over the substance, the volume of water which might be used to bypass the brewing substance, on and off periods for controlled pulse-brewing, preinfusion volume and time, as well as other brewing parameters. In an apparatus 12 in the form of a beverage reconstituting device which reconstitutes a concentrate by mixing it with water, an example of such beverage preparation parameter information may include, but is not limited to the volume of water, the dispense rate of the concentrate, and period of time in which a mixing chamber of the dispenser portion is flushed with cleaning water at the end of dispense cycle, as well as other beverage preparation parameters.

The system 10 of the present disclosure includes an input device 36 and a sensory output device or display 38 coupled to the controller 14 via communication links or paths 40, 42, respectively. The input device 36 either alone or in combination with the display 38 define one form of user interface. Many beverage apparatus 12 include an input device 36 to activate a beverage brewing or production cycle in the apparatus, control warming or heat retaining functions as well as, perhaps, make adjustments to beverage preparation parameters. The display 38 presents the information being adjusted or actuated by the input device 36. It is envisioned that the display 38 includes a visual or optical display as well as sound or auditory display.

The visual or optical display 38 can be in the form of a inactive display such as a video display as well as liquid crystal, LED or other forms of visual displays. The auditory display may be represented in the form of tones as well as voices or other auditory signals.

With the addition of the input device 36 and display 38, additional transferable information can be communicated from the storage device 20 to the apparatus 12. For example, beverage and non-beverage information in the form of advertisements can be transferred from the programming device 24 to the storage device 20 for use in communicating transferable information 26 through the communication device 28 to the controller 14. The controller 14 can then display advertisements or other messages on the display 38 in response to various or selected inputs. For example, the advertisements can be effective in a situation in which the apparatus 12 is placed in the general public whereby the general public is required to be an audience while beverage is being dispensed. Such a situation might include apparatus 12 in which a reservoir is contained in the apparatus and the user needs to stand in front of the apparatus 12 and, consequently, the display 38, to dispense a cup of coffee from the apparatus 12. This mandatory advertising audience also occurs when the apparatus systematically dispenses a single serving whereby the user must wait for the apparatus 12 to dispense the serving during which the user is at least positioned in front of the display 38.

The transferable information could also be in the form of non-beverage information and beverage information. For example, non-beverage information might relate to information and warnings which can be communicated to the user. For example, beverage information might relate to the temperature and contents of the beverage as well as nutritional information. Non-beverage information in addition to the advertising material noted above, can include what is not limited to warnings and system apparatus information. For example, the non-beverage information, the confirmation of the beverage parameters or warnings about the condition of various components, subsystems or devices within the apparatus. It is also envisioned that maintenance reminders could be included in the non-beverage information.

Figure 4:
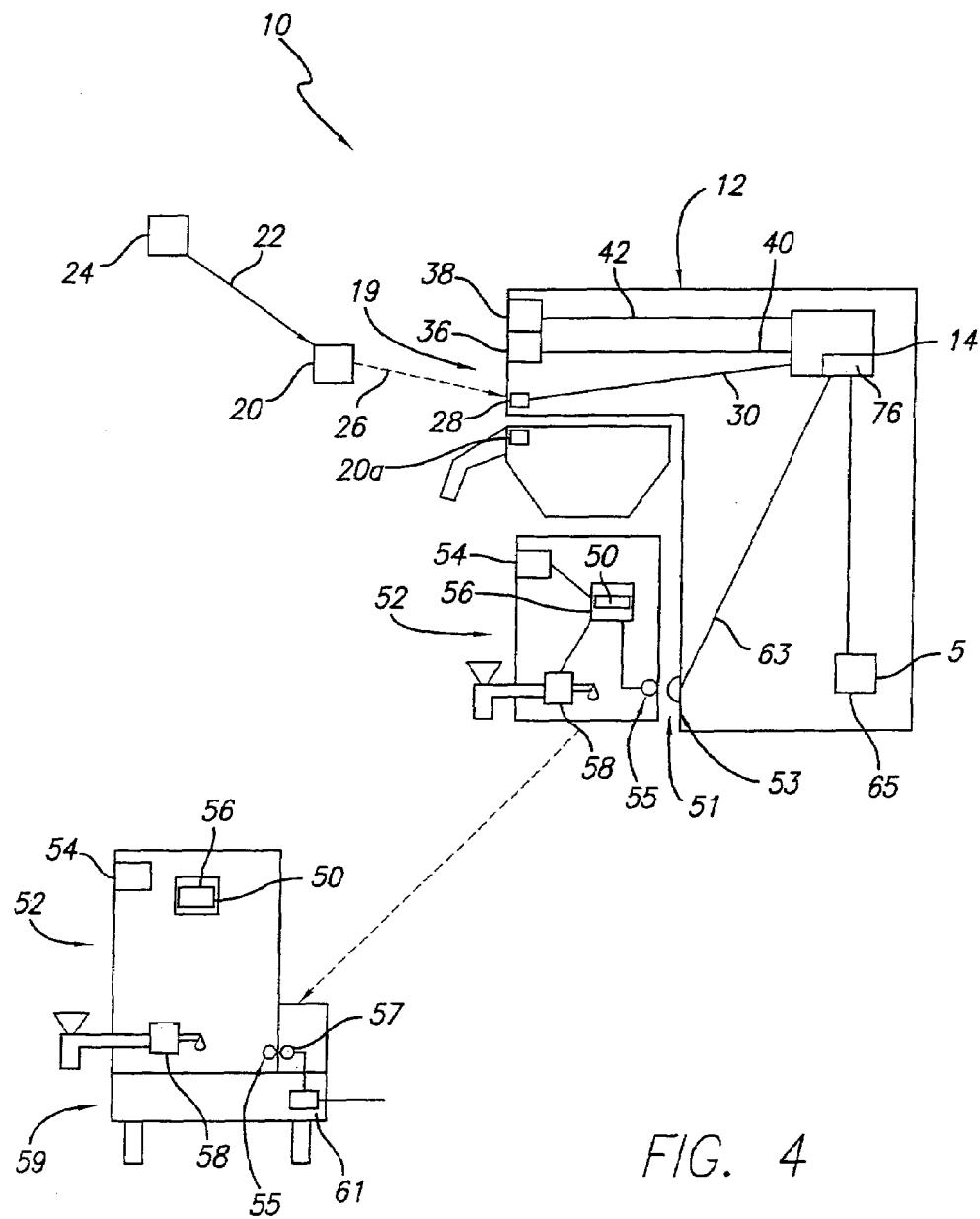
FIG. 4 is a diagrammatic illustration of an embodiment of the system and method as disclosed using a beverage apparatus including a beverage dispenser having a display device.

As will be described in greater detail below regarding FIG. 4, this use of advertising might also occur where the controller 14 communicates the information to a memory storage device 50 in a dispenser 52. The dispenser 52 also includes a dispenser sensory output or dispenser display 54, a dispenser controller 56 and controllable dispense valve 58. In this example, the dispenser 52 is moved to location spaced from the apparatus 12 to allow customers to dispense their own beverage. Such a device is disclosed in U.S. Pat. No. 6,089,409, issued Jul. 18, 2000, assigned to the assignee of the present disclosure and expressly incorporated herein by reference in its entirety. When a customer dispenses beverage from the dispenser 52 using the controllable dispense valve 58, the controller 56 will cause a message to be presented via the display 54.

The dispenser 52 as shown includes a coupler 51 which communicates with the apparatus 12 by way of a first contact 53 on the apparatus and a second contact 55 on the dispenser 52. The dispenser can be moved to a remote station 59 which includes a third contact 57. When positioned at the remote station the dispenser can draw power from the station 59 to provide power from a power source 61. When positioned at the apparatus 12, the dispenser 52 communicates with the controller 14 via communication link 63. The apparatus 12 provides a power source 65 to power the components of the apparatus 12 and the dispenser 52 when it is positioned at the apparatus 12.

A system 10 having one-way communication from the storage device 20 to the communication device 28 has been generally described. However, there may be the need to communicate from the apparatus 12 to the storage device 20. As will be described below, the communication device 28 may be used a two way communication device to transfer information from the apparatus 12 to facilitate collection of information about the operation of the apparatus 12 such a validation of recipe content, historical activity and maintenance activity. This use of the communication device 28 can be used with the dispenser 52 to collect historical information about the operation of the dispenser such as when an how much beverage was dispensed, temperature of the beverage dispensed, volume dispensed during a serving event, as well as other information. In this embodiment, the communication device 28 can transmit to the storage device 20 and the storage device is writeable or programmable by the communication device 28. Also, the apparatus 12 will store information in the memory 76 until it transmits to the storage device 20. The controller 14, communication device 28 and memory 76 define one form of means for storing and transmitting information 17.

The system 10 of the present disclosure is useful to change the programming of an apparatus 12 such as updating, modifying or refining recipes which might occur when taste trends or preferences change as well as when recipes are modified, when brewing substance material or grind is changed, when reconstituting substance formulas are changed, or as the result of further development of beverage preparation parameters among other things. Also, the present system 10 may be useful to easily and efficiently reprogram an apparatus 12 which is transferred between locations or transferred between owners.

The present system 10 allows for large scale distribution of transferable information retained on a storage device 20 to a variety of geographically dispersed users. For example, if a franchiser plans to have their franchisees program their apparatus 12 in a consistent manner, the franchiser can use a programming device 24 to program 22 a large quantity of storage devices 20 which can then be sent to the numerous, generally geographically dispersed franchisees efficiently, reliably and inexpensively. For example, a transponder chip such as a Temic semiconductor RF identification device, manufactured by Temic Semiconductors, Germany, could be used for the storage device 20. The Temic device is relatively inexpensive to purchase, program, and distribute and is not easy to accidentally reprogram or erase.

The other devices also identified herein provide a relatively inexpensive device to purchase, program and distribute and are generally very reliable and not easily reprogrammed or erased. Even the electrically based devices which tend to have a higher cost than the printed storage devices are relatively inexpensive in quantity. The generally low cost and, ease of use and reliability justify the additional cost of using a communication device 28 to communicate with controller 14.

An additional value of having the storage device 20 is that once the user receives the storage device 20 the user generally cannot modify the information retained on the storage device. For example, if a transponder chip is used, the chip can be electronically locked to prevent modification. Similarly, use of a bar code, magnetic strip or other device such as a conductive or inductive component may be made to prevent modification. Additionally, currently available storage devices 20 handle large quantities of information making it rather useful for programming a variety of parameters. Using a beverage brewing apparatus 12 as an example, numerous parameters for numerous recipes can be stored on a single storage device 20. For example, a relatively inexpensive and small, disposable storage device 20, such as a transponder chip, for example the Temic device, may be able to store approximately one or two recipes including numerous brewing parameters.

Additionally, it may be advantageous, although not specifically required, to provide the storage device 20 in a disposable, inexpensive and generally resilient form to make it usable on a variety of platforms. For example, the storage device may be provided on a card which is packaged and distributed with products to be used with the apparatus. For example, the card could be packaged in a container or carton containing multiple packages of whole bean or pre-ground coffee or brewing substance known as fractional packs. For example, in the convenience store industry a large quantity of fractional packs of whole bean or pre-ground coffee may be delivered to a convenience store. A card containing a storage device 20 can be provided in the carton and used by the operator to program the apparatus 12.

With the convenience store example in mind, a carton of fractional packs may be delivered to the convenience store whereupon the operator of the convenience may use the communication device to read a bar code, chip, magnet strip or other storage device 20 printed on the shipping label or container. This would improve the speed and efficiency of transferring the information from the storage device 20 to the apparatus 12.

In another embodiment of the present disclosure, the storage device 20 may be attached to the individual fractional packages or coffee or brewing substance. The individual packages carrying the storage device 20 can be passed through, in close proximity to or in contact with the communication device whereupon the information about the specific fractional pack is read into the apparatus 12. This would allow specific information to be read into the apparatus 12 in relation to each fractional pack consumed.

With the foregoing in mind, further information relating to the communication device 28 is provided. Communication device 28 may be in the form of a chip reader which receives a transponder signal, inductive coupling or conductive coupling. If the storage device 20 is in the form of a magnetic strip, a strip reader may be provided on the communication device 28 to read the corresponding magnetic strip.

With the example of the storage device 20 being attached to an individual fractional pack, the magnetic strip may be incorporated on the package which is then cut by a sharp surface provided on the communication device 28 thereby opening the package and simultaneously reading the information from the storage device 20. An embodiment employing a bar code or other code, a form of the communication device 28 may include a bar code reading wand, bar code gun or other interface attachments which satisfies the requirements of providing a communication device 28 to transfer information 26 from the storage device 20.

Figure 5:
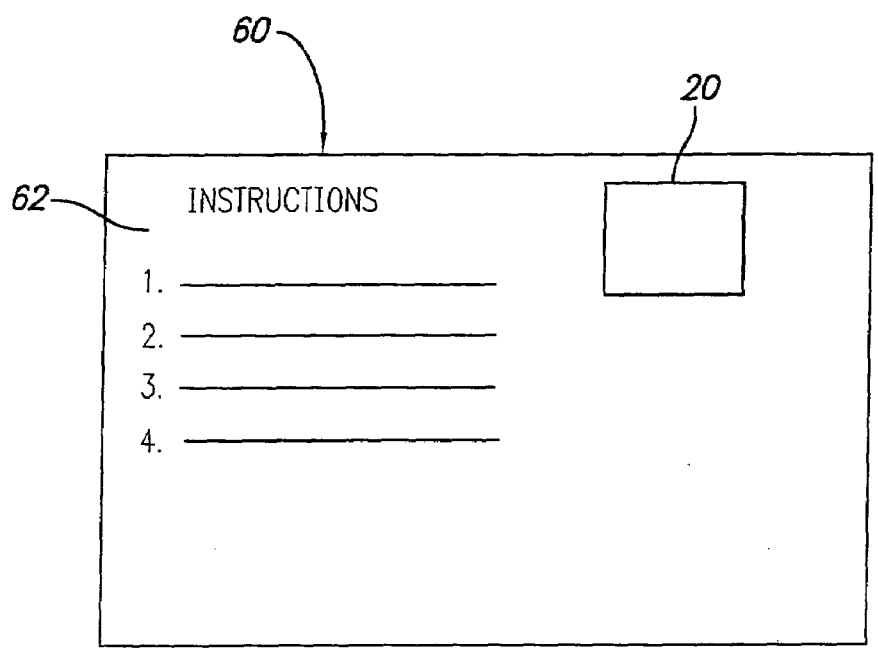
FIG. 5 is a diagrammatic illustration of an embodiment of a storage device retained on a card or other similar delivery device.

With reference to FIG. 5, the embodiment of the storage device 20 retained on a card or other similar delivery device 60 is shown. The delivery device 60 can include additional information 62, for example instructions to facilitate use of the card received by the party using the fractional packs. For example, the card could include the instructions on one side for use with one apparatus such as a grinder and instructions on the other side for use with another apparatus such a brewer. This would increase the use of the delivery device 60 and increase the reliability and continuity of the information transferred to the devices.

With regard to a specific example of the instructions, the grinder instructions may include steps of removing the funnel from the grinder, pressing and releasing a control button on the grinder, holding the delivery device 60 underneath the communication device 28, reading information displayed on the grinder to confirm reading of the storage device 20 and operating the control to transfer the information from the storage device 20 to the grinder. Similarly, instructions for the brewer would be similar or identical to the grinder. Additionally, because the apparatus 12 can be provided with an input device 36 and a display 38, the user can activate or operate various controls or switches at the input 36 by following the instructions displayed by the display 38. This mode of operation requires that the communication device 28 read the information from the storage device 20 and communicate it 30 to the controller 14. As noted above, the controller 14 includes a microprocessor of known construction as well as memory functions. The microprocessor then operates the display 38 in response to the information on the storage device 20 and receives command controls or responses from the input device 36. This will facilitate the transfer of information, verification information and other related steps associated with the communication between the storage device 20 and the apparatus 12.

Figure 6:
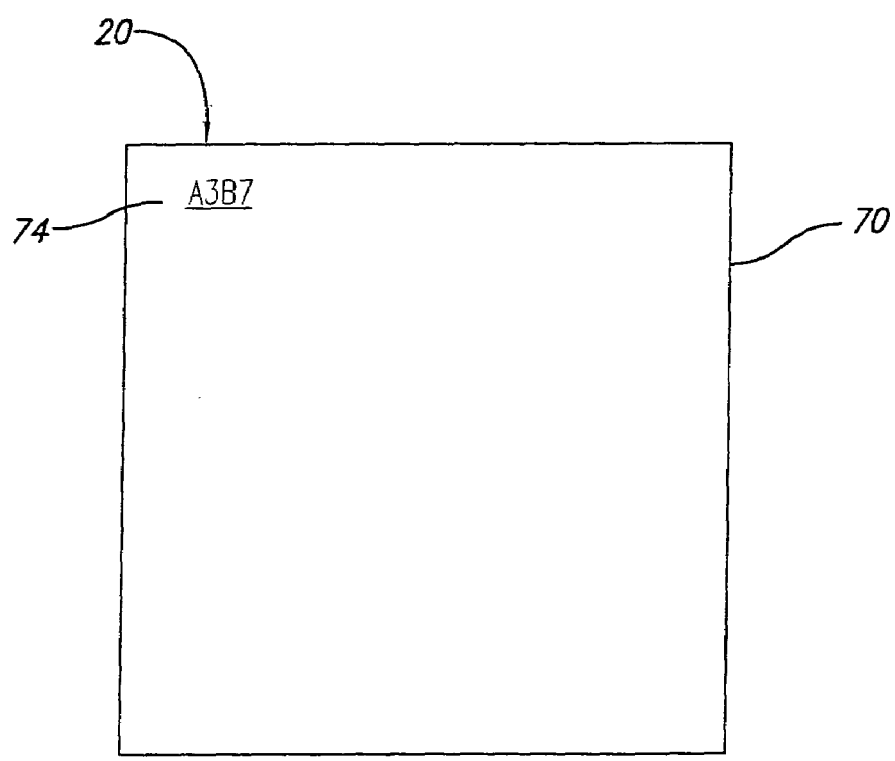
FIG. 6 is a diagrammatic illustration of an embodiment of a storage device in the form of a vehicle and a code carried on the vehicle.
Figure 14:
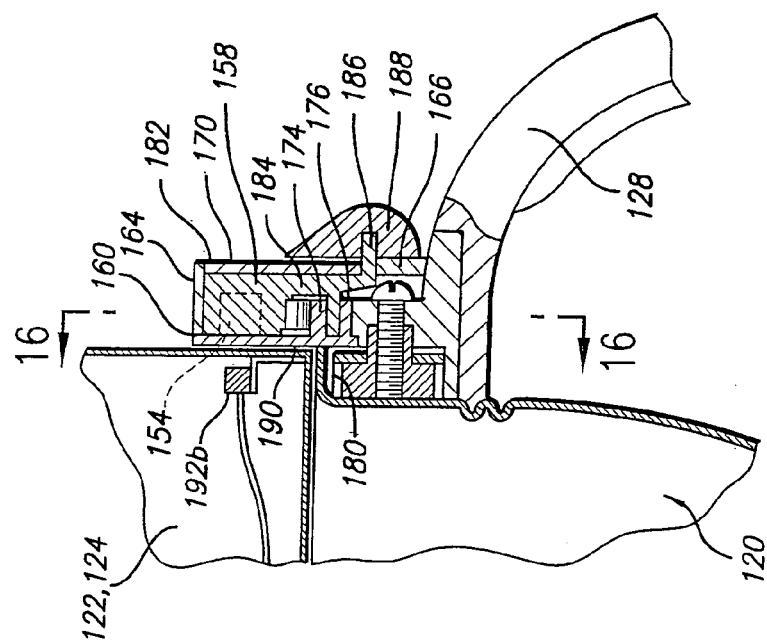
FIG. 14 is a cross-sectional view of the funnel and the machine along line 14—14 in FIG. 13.

Yet another embodiment is shown in FIG. 6, the storage device 20 comprises a vehicle 70 such as a card, a code 74 provided on the card for storing transferable information in printed form. In this embodiment, the code can be entered into the controller 14 by way of the input device 36. In this manner, the user uses the input device 36 to enter the code 74 provided on the card 70. In this embodiment the input device 36 acts as the communication device to provide information from the vehicle or card 70 to controller 14. It should be noted, that the communication device 28 may be used with the embodiment as shown in FIG. 6 by employing an optical character reader of known construction to read code presented on the card.

Further to the description of the embodiment in FIG. 6 as described above, the apparatus 12 includes a memory device 76 coupled to the controller 14. The memory device 76 stores at least one of the transferable information including beverage preparation parameters, groups of beverage preparation parameters and parameters relating to a recipe for beverage preparation. This information stored on the memory device 76 can be selectively accessed by entry of the code 74 from the vehicle 70. As such, the code 70 merely needs to be the minimum number of symbols which can be used to access the information stored in the memory 76. In this regard, the information stored in the memory 76 may be the beverage preparation parameters as described above, groups of beverage preparation parameters or parameters which define an entire recipe for beverage preparation. As such, the code 76 can represent individual preparation parameters such as temperature, slow rate, water flow rate, water volume as well as other parameters.

The code or portions of the code may also represent groups of beverage preparation parameters which may be applicable for a particular recipe. For example, a group of beverage preparation parameters may be a volume of water that is required for a specific type of ground coffee to be brewed and group includes the volume for various quantities of coffee to be brewed. In this regard, this group of beverage preparation parameters relating to the water used to brew a particular recipe would be adjusted for a small batch, half batch or full batch of brewed beverage. This may be a useful grouping of parameters because the volume of water may change depending on the grind of coffee, whether the coffee is decaffeinated or regular, as well as if flavors are added to the coffee. Additionally, the code may relate to an entire recipe defining all of the parameters for a specific type of coffee or other beverage. In other words, the entire recipe could be stored on the memory device 76 and only called into activity when the code is entered into the controller 14.

A further embodiment of the present disclosure employs a storage device 20 in the form of acoustic delivery device. Such an acoustic delivery device could be a tone generating component applied to the vehicle which, when activated, transmits an acoustic signal for delivery to the communication device 28. Also, the acoustic device could be in the form of a telephone, wired or wireless which is placed in proximity to the communication device 28 in the form of an acoustic coupling device of known construction so that once an acoustic signal is transmitted through the storage device 20, in the form of a telephone, is transmitted to the acoustical signal receiving device (28) receiving and transmitting the transferable information, in the form of the acoustic signal, from the telephone 20 to the controller 14.

Turning now to the method of use of the present disclosure, reference will be made to FIGS. 1–5. In particular, referring to FIG. 3, an example is described in which a dispenser 70 and an apparatus 12 are used to produce a beverage. The dispenser 70 in this example is in the form of a whole bean coffee grinder, powder dispenser or other beverage substance dispenser. The apparatus 12 is in the form of a beverage brewer or reconstituting device. Beverage brewing substance is dispensed from the dispenser 70 into a corresponding funnel 74 including a storage device 20a carried on the funnel. The funnel 74 is compatible with both the dispenser 70 and the apparatus 12 through mounting structures of known construction which are widely used in the beverage producing industry.

In this example the fixed storage device 20a is different from the storage device 20 such that it is carried on the funnel. While the funnel can be designed to provide a housing to allow placement of the storage device 20a, it is generally envisioned that the storage device 20a will be retained on the funnel. In the present example, a storage device 20a is used to read information into the dispenser 70 by way of the communication device 28a and allows information to be read into the apparatus 12 by use of the communication device 28a. Once the information is read from the communication device 28a into the corresponding controllers 14a, 14 the information is resident for use in the devices 70, 12 for use in beverage preparation or other communication as noted above. Generally, in this example, each of the funnels 74 are dedicated to a specific recipe. In this regard, one funnel 74 may be dedicated to decaf whereas another funnel 74 may be dedicated to regular coffee.

Further, funnels 74 may be dedicated to different flavors of coffee as well as different quantities of coffee. This requires additional funnels 74 to be retained in conjunction with the beverage brewing apparatus 12 to prevent mismatching recipes and as such improve the accuracy and reliability of the beverage produced.

Continuing with the example, the funnel 74 is positioned in the dispenser 70 for receiving a charge of beverage brewing substance therefrom. The communication device 28*a* is positioned on the dispenser 70 to be in close proximity to the storage device 20*a* retained on the funnel 74 so that the information can be read from the storage device 20*a* to the communication device 28. Reference to the relationship of the storage device 20*a* and communication device 28*a* can be found with further reference to the description above regarding FIG. 1. The storage device 20*a* provides the identity of the funnel 74 which then instructs the dispenser 70 to dispense a quantity of a particular substance as identified by the storage device 20*a*.

The funnel 74 is then removed from the dispenser 70 and transferred to the brewer 12. By placing the funnel 74 in the brewer 12 communication device 28 reads the fixed storage device 20*a* which identifies the brewing substance contained in the funnel 74 and brewing parameters associated with that brewing substance. Alternatively, the small amount of information can be retained on the storage device 20*a* such as the type and quantity of brewing substance. This will then activate the recipe retained in the memory 76 of the controller 14 thereby facilitating the execution of the desire recipe or other preparation parameters.

In the foregoing example, the funnel 74 is dedicated and the communication devices 28, 28*a* are generally one-way communication devices with regard to the funnel 74. In this regard, the communication device 28 reads the information from the storage device 28 to obtain the identity of the funnel 74 and provide information as to what the operator of the system wishes to obtain from the dispenser 70. Similarly, the brewer 12 similarly obtains identity information from the funnel 74 through the communication device 28 to provide information to control the brewing process.

This embodiment of the disclosure helps to reduce potential brewing errors. As such, the only error that could occur in this situation would be for the operator to use the wrong funnel 74 with the expected brewing operation. This would result in an error only in the expectations of the operator as to the type of beverage to be brewed and not the type of beverage dispensed or brewed. In other words, if the operator uses the wrong funnel the system 10*a* will still dispense the quantity and type of brewing substance identified by the funnel and brew the substance identified by the funnel to the parameters defined by the recipe.

This system also allows an operator to set up several different funnels with beverage brewing substance in advance of peak operating hours. For example, the operator of a coffee bar anticipating high demand during morning or noon hours could set up several funnels 74 of beverage brewing substance, desired quantities of substance in advance of customers arriving. As the brewed beverage is depleted, a new funnel 74, 74*b*, 74*c* can be quickly and easily placed into the brewer 12 and activated by the operator. This would eliminate the need to wait for grinding of fresh whole beans at the dispenser 70 would eliminate potential confusion associated during peak hours which might otherwise cause a mismeasurement or other error.

In another embodiment of the present disclosure, the system 10*a* allows for a greater degree of control by the operator compared to the immediately preceding example.

Figure 3:
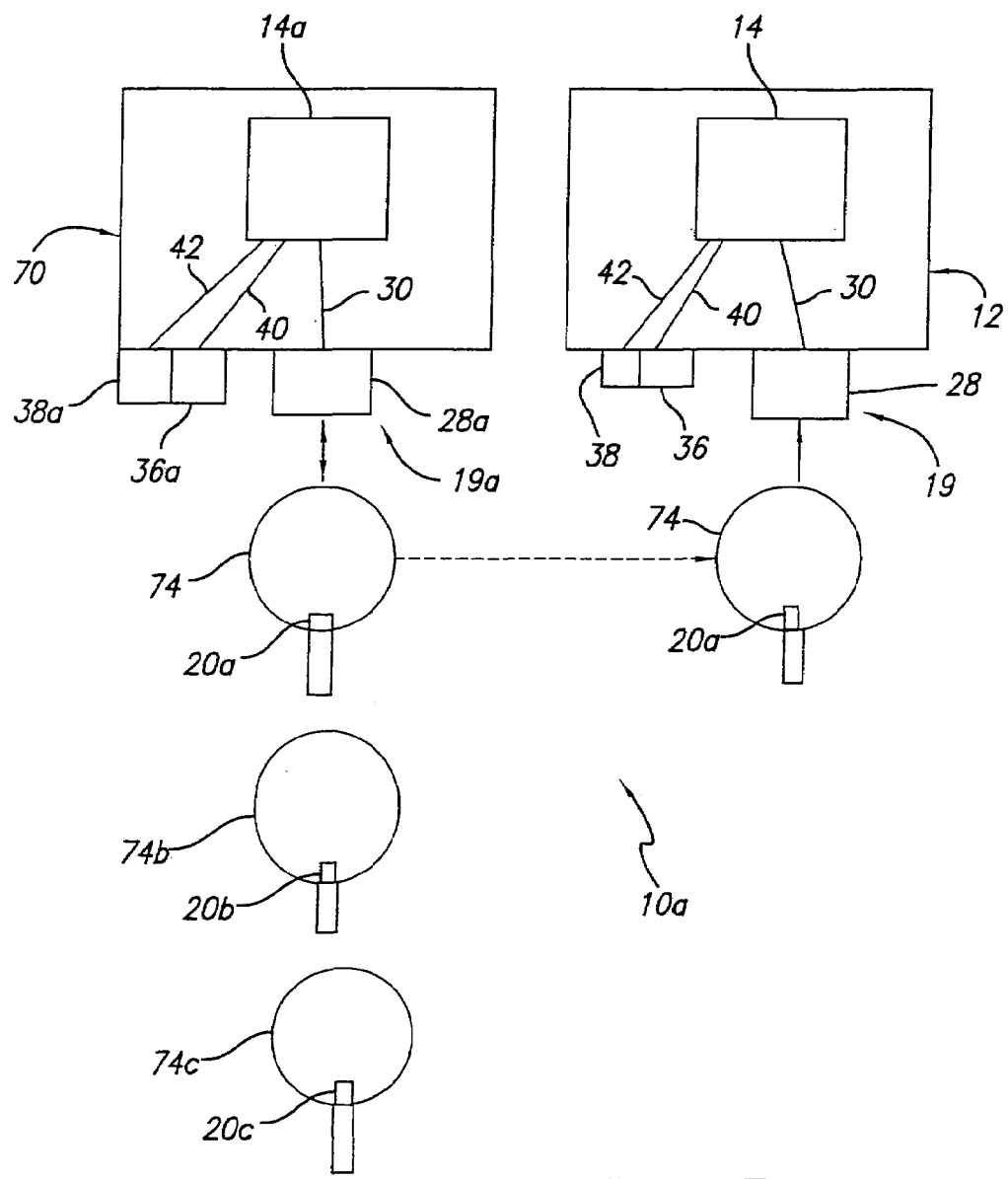
FIG. 3 is a diagrammatic illustration of an embodiment of the system and method as disclosed using a beverage substance dispenser apparatus.

With further reference to FIG. 3, the operator places a funnel 74 at the dispenser 70 in preparation for receiving a beverage brewing substance from the dispenser to the funnel. In this example, the fixed storage device 20*a* carried on the funnel before it is positioned in close proximity to the communication device 28. The operator uses the input device 36*a* at the dispenser 70 to make limited or all beverage choices. Limited choices may be made so as to prevent brewing errors as well as maintain some degree of recipe consistency. For example, the operator may be allowed to choose the type and quantity of beverage brewing substance to be dispensed from the dispenser 70. Further, the system 10*a* may lockout or prevent the operator from controlling other parameters such as the fineness or degree of grind of the whole bean substance being ground.

The dispenser 70 then transfers information to the fixed storage device 20*a* and downloads the identity and information relating to the beverage brewing substance dispensed into the funnel 74. This allows any funnel having a storage device 20*a* to receive information from the dispenser 70 about the substance to be brewed. This eliminates the need for having numerous specific or dedicated funnels for the numerous quantities and types of beverage to be brewed.

The funnel 74 is then transferred to the brewer 12 to provide the storage device 20*a* as read by the communication device 28. Information transferred from the dispenser 70 to the fixed storage device 20*a* identifies the type of beverage brewing substance and quantity. A recipe retained at the brewer 12 operates the brewer 12 based on the parameters of the recipe. In the present example, the parameters of the brewer can not be adjusted by the operator, as such the operator merely needs to activate a start switch at the control 36.

In the foregoing example, the storage device 20 can be used to transfer specific information about recipes to both the dispenser 70 and the brewer 12. For example, as discussed above with regard to the card 60, the card can be placed next to the communication device 28 of the dispenser 70 whereupon information relating to dispensing parameters such as the degree of grinding whole bean coffee for each particular recipe is read into the dispenser controller memory 14*a*. As such, when operator selects a type of coffee, for example, whole bean, espresso roast, decaf, the dispenser has the grinding time and dispensing time parameters stored. As such, when the dispenser 70 is activated to dispense a volume for a full batch of espresso roast, decaf coffee, it will look up the parameters from the memory, activate the dispenser to dispense the desired quantity of whole beans and grind the whole beans to the desired fineness and dispense the ground coffee to the funnel 74.

The card 60 is also used to transfer information about specific recipes to the brewer 12. In the same type of coffee example as presented above, the brewing parameters including pre-infusion, quantity of water to be used and other parameters for fresh ground espresso roast, decaf coffee are stored in the memory of the controller 14. As such, when the funnel 74 including a charge of beverage brewing substance for a full batch of espresso roast coffee is transferred to the brewer, the recipe information will be already resident at the memory. When the operator activates the control 36 to start the brewing process, the communication device 28 will read the information from the fixed storage device 20*a* and communicate it to the controller 14. The controller 14 will look up the information relating to the specific recipe associated with the brewing substance retained in the funnel and will operate the brewer 12 to provide the desired quantity of water and other parameters in accordance with the recipe.

It should be noted, as an additional feature of the present disclosure, the system 10, 10a provides a failsafe mechanism. The system 10, 10a will not allow for operation of the dispenser 70 or brewer 12 unless a funnel is properly positioned relative to the devices 70, 12. The communication device 28a and storage device 20a operate to provide a positive feedback as to the readiness to receive beverage brewing substance (in the case of the dispenser 70) for brewing water (in the case of the brewer 12). As such, the present disclosure provides yet another error reducing benefit to the beverage producing process. If the funnel 74 is missing or improperly positioned, the system 10, 10a will lockout and prevent dispensing or brewing. As displays 38, 38A are provided on the devices 70, 12 the operator can be alerted to the improper funnel placement. The display and signal indicating improper funnel placement or missing funnel can be communicated through any of a number of communication systems including sound, flashing lights, or word displays on a display screen.

Another embodiment of the present disclosure provides a brewing substance dispenser, beverage maker and funnel interface and its method of use. The interface is provided by a funnel 120, 220, 220a which can be mounted on a brewing substance dispenser 122, 222, 222a or a beverage maker 124, 224, 224a.

As shown in FIGS. 7–20, the funnel 120 includes a body 126 having a handle 128 mounted thereon. The handle 128 is mounted on the body 126 by conventional means. The body 126 has a side wall 130 which is generally conical and a bottom wall 132 which is generally flat and has a discharge aperture (not shown) therethrough. The upper end of the body 126 is open.

The handle 128 has an upper portion 134 which is aligned with the side wall 130 and a gripping portion 136 which protrudes outwardly from the side wall 130 of the body 126 so that a user can grip the handle 128 and carry the funnel 120. A portion of the upper portion 134 of the handle 128 extends upwardly from the uppermost end of the body 126.

The funnel 120 has a selector 138, 138a thereon which allows a user to select a desired batch size and type of a beverage, such as coffee. Type of beverage may be used to denote regular and decaffeinated coffee, for example, different flavors of the beverage, for example, and the like. As described herein, type of beverage is described as regular and decaffeinated. Another embodiment of the selector 138 is shown in FIGS. 7–12. An embodiment of the selector 138a is shown in FIGS. 13–20.

Attention is directed to the embodiment of the selector 138. As shown in FIGS. 7–10, the selector 138 takes the form of a knob 138 having a pair of imbedded magnets 140, 142. The knob 138 is rotatably mounted on the handle 128 by conventional means. The knob 128 has an upper portion which extends upwardly from the uppermost end of the body 126 and a lower portion which overlaps the upper end of the body 126. The pair of magnets 140, 142 are imbedded within the knob 138 proximate to the side wall 130 of the body 126 and are diametrically opposed to each other on the knob 138. Magnet 140 is mounted such that its north pole (N) is proximate to the side wall 130 of the body 126 and the south pole (S) is positioned away from the side wall 130 of the body 126. Magnet 142 is oppositely mounted such that its south pole (S) is proximate to the side wall 130 of the body 126 and the north pole (N) is positioned away from the side wall 130 of the body 126.

The exterior surface of the knob 138 has a plurality of indicia thereon, see FIG. 7. One half of the knob 138 has indicia thereon which designates regular coffee (REG) and specifies a batch size of small (S), medium (M) or large (L). The other half of the knob 138 has indicia thereon which designates decaffeinated coffee (DECAF) and specifies a batch size of small (S), medium (M) or large (L). As shown in the drawings for this embodiment, magnet 140 is positioned behind the medium (M) indicia of regular coffee, and magnet 142 is positioned behind the medium (M) indicia of decaffeinated coffee.

Sensors 144a, 144b, 144c are carried on the brewing substance dispenser 122, such as a coffee grinder, or on the beverage maker 124, such as a coffee brewer, for sensing the setting selected by the user on the funnel 120 when the funnel 120 is mounted on apparatus such as the brewing substance dispenser 122 or on the beverage maker 124. As shown in the drawings for this embodiment, these sensors 144a, 144b, 144c take the form of three (3) Hall effect sensors 144a, 144b, 144c imbedded in a front wall 146 at predetermined positions of the brewing substance dispenser 122 or the beverage maker 124. The setting on the knob 138 is then wirelessly communicated to the controller of the brewing substance dispenser 122 or to the beverage maker 124, depending on which apparatus the funnel 120 is mounted, to determine a pre-programmed dispensing time, volume or weight. These sensors 144a, 144b, 144c are coupled to a respective controller which controls the operation of the respective apparatus 122 or 124.

When the funnel 120 is mounted on the brewing substance dispenser 122 or the beverage maker 124, the upper portion 134 of the handle 128 which extends upwardly from the uppermost edge of the body 126 and the portion of the rotatable knob 138 thereon align with the front wall 146 of the brewing substance dispenser 122 or the beverage maker 124 and the magnet, for example and as shown in the drawings for this embodiment, magnet 140, aligns with one of the Hall effect sensors, for example and as shown in the drawings for this embodiment, Hall effect sensor 144b. The Hall effect sensor 144b senses the presence of the magnet 140 and an appropriate voltage is sent to the controller of the brewing substance dispenser 122 which instructs the brewing substance dispenser 122 to grind an appropriate amount of coffee of a particular coffee type or to the control circuitry of the beverage maker 124 to brew an appropriate amount of coffee, depending on which component the funnel 120 is mounted.

FIG. 11 shows a chart which illustrates the voltages which would be sent to the controller depending on which setting is selected by the user. The user simply selects a setting by rotating the knob 138 until the desired batch size aligns with the arrow indicia 148 provided on the upper portion 134 of the handle 128, see FIG. 7. Detection of the magnet 140 or 142 by Hall effect sensor 144a indicates a large (L) batch of coffee has been selected; detection of the magnet 140 or 142 by Hall effect sensor 144b indicates a medium (M) batch of coffee has been selected; and detection of the magnet 140 or 142 by Hall effect sensor 144c indicates a small (S) batch of coffee has been selected. Detection of the north polarity of magnet 140 by one of Hall effect sensors 144a, 144b or 144c sends a positive going output voltage to the brewing substance dispenser 122 controller or to the beverage maker 124 controller, depending on which component the funnel 120 is mounted, to indicate that regular coffee has been selected; and detection of the south polarity of magnet 142 by one of Hall effect sensors 144a, 144b or 144c sends a negative going output voltage to the brewing substance dispenser 122 controller or to the beverage maker 124 controller, depending on which component the funnel 120 is mounted, to indicate that decaffeinated coffee has been selected. FIG. 12 illustrates a typical schematic diagram of the Hall effect sensor 144*a*, 144*b*, 144*c* circuitry using commonly available components. As shown in the drawings for this embodiment, the controller would be instructed to process a medium batch of regular coffee. The Hall effect sensor 144*b*, which senses a medium (M) batch size, would sense the north polarity of magnet 140, thereby indicating a regular coffee selection, and accordingly instruct the controller. If, for example, the knob 138 were set to decaffeinated coffee with a large (L) batch size, Hall effect sensor 144*a*, which senses a large (L) batch size, would sense the south polarity of magnet 142, thereby indicating a decaffeinated coffee selection, and accordingly instruct the controller.

In use, the user selects the beverage batch size and type by rotating the knob 138 until the associated indicia aligns with the arrow indicia 148. The funnel 120 is first mounted on the brewing substance dispenser 122 for the appropriate dispensing of the beverage, such as by grinding, and then is physically transported to the beverage maker 124 for producing the beverage, such as by brewing. Therefore, information on batch size and the type of beverage is stored in the funnel 120 and is communicated to the brewing substance dispenser 122 and the beverage maker 124 when the funnel 120 is mounted on each. Because the information is carried with the funnel 120, there is no need for an interconnecting cable and therefore, the present system is wireless. The elimination of the cable permits the brewing substance dispenser 122 to serve any number of beverage makers 124. The operation is greatly simplified because only the setting on the knob 138 on the funnel 120 is set; there are no switch settings required on the brewing substance dispenser 122 and no switch settings required on the beverage maker 124.

Attention is directed to the embodiment of the selector 138*a*. As shown in FIGS. 13–16, the selector 138*a* takes the form of a slide switch assembly 150 which has a pair of imbedded magnets 152, 154. The slide switch assembly 150 includes a housing 156 which is mounted on the upper portion 134 of the handle 128 and a slide member 158 which is mounted thereto.

The housing 156 includes a rear wall 160, opposite side walls 162 which extend perpendicularly to the rear wall 160, a top wall 164 which extends perpendicularly to the rear wall 160, and a front wall 166 which is parallel to the rear wall 160 and is connected to the side walls 162 and to the top wall 164. The front wall 166 has a cutout 168 therein in which a cover 170 is mounted by suitable means. The cover 170 covers a portion of the cutout 168, such that a slot 172 is provided between the bottom of the cover 170 and the front wall 166. Upper and lower rail portions 174, 176 protrude outwardly from a bottom section of the rear wall 160 and are perpendicular thereto such that the upper and lower rail portions 174, 176 protrude outwardly toward the cover 170. The upper and lower rail portions 174, 176 are spaced apart from each other and span substantially the entire width of the rear wall 160. The upper rail portion 174 has a plurality of notches 178 therein, see FIG. 16, which are spaced apart from each other, for reasons described herein. The housing 156 may be made of plastic or other suitable material. The upper and lower rail portions 174, 176 are preferably integrally formed with the rear wall 160, but may be formed separately and suitably attached thereto.

The slide member 158 includes an upper portion 180 which is positioned between the upper rail portion 174 and the top wall 164, a lower portion 182 which is positioned between the upper rail portion 174 and the lower rail portion 176 and sits against the upper rail portion 174 and the lower rail portion 176, a connecting portion 184 which connects the upper portion 180 to the lower portion 182 and which sits against the exterior surface of the upper rail portion 174, and a knob connection portion 186 which extends outwardly from the lower portion 182 and through the slot 172 between the cover 170 and the front wall 166. The upper portion 180 sits against the top wall 164 and is spaced from the upper rail portion 174 a predetermined distance. The slide member 158 has a predetermined width which is substantially less than the width of the cutout 168. The slide member 158 maybe made of plastic or other suitable material and is preferably a one-piece construction.

A knob 188 is attached to the free end of the knob connection portion 186 by suitable means and overlaps the exterior surface of the cover 170. The knob 188 may be made of plastic or other suitable material.

A steel spring detent 190 is mounted to the upper portion 180 of the slide member 158 and is positioned between the upper portion 180 and the upper rail portion 174 of the housing 156. The spring detent 190 is generally V-shaped and the free ends are imbedded within the upper portion 180 of the slide member 158. The point of spring detent 190 sits against the upper surface of the upper rail portion 174. As the slide member 158 is moved along the slot 172 relative to the housing 156, the spring detent 190 flexes and the point slides across the top surface of the upper rail portion 174. The point of the spring detent 190 will move into and out of the notches 178 as the slide member 158 is moved across the upper rail portion 174 so as to provide a "feel" to the user that the slide member 158 has been correctly positioned along the length of the slot 172.

The pair of magnets 152, 154 are imbedded within the upper portion 180 of the slide member 158 and are proximate to the rear wall 160. The magnets 152, 154 are spaced apart from each other a predetermined distance. Magnet 152 is mounted such that its south pole is proximate to the rear wall 160 and thus proximate to the side wall 130 of the funnel 120, and the north pole is positioned away from the rear wall 160 and thus away from the side wall 130 of the funnel 120. Magnet 154 is oppositely mounted such that its north pole is proximate to the rear wall 160 and thus proximate to the side wall 130 of the funnel 120, and the south pole is positioned away from the rear wall 160 and thus away from the side wall 130 of the funnel 120.

Figure 13:
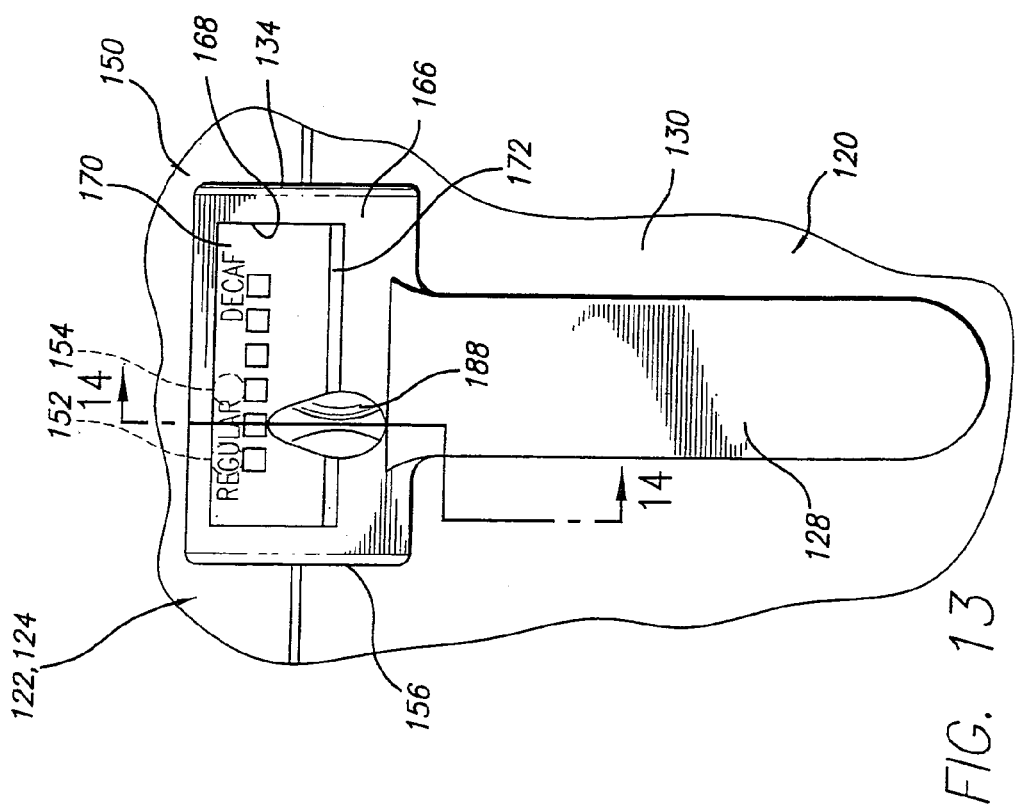
FIG. 13 is a side elevational view of a portion of a funnel which incorporates the features of the disclosure and showing a portion of a machine, such as a brewing substance dispenser or coffee grinder, or a beverage maker or coffee brewer, to which the funnel is attached in side elevation.

The cover 170 has a plurality of indicia thereon, see FIG. 13. One half of the cover 170 has indicia thereon which designates regular coffee (REGULAR) and specifies a batch size of small (by showing a box having less than half darkened), medium (by showing a box being half darkened) or large (by showing a box having more than half darkened). The other half of the cover 170 has indicia thereon which designates decaffeinated coffee (DECAF) and specifies a batch size of small (by showing a box having less than half darkened), medium (by showing a box being half darkened) or large (by showing a box having more than half darkened). As shown in FIGS. 13–16 of this embodiment, the knob 188 is positioned on a medium batch of regular coffee. This results in magnet 152 being positioned behind the small indicia of regular coffee, magnet 154 being positioned behind the large indicia of regular coffee, and there is no magnet positioned behind the medium indicia of regular coffee.

Four sensors 192*a*, 192*b*, 192*c*, 192*d* are carried on the brewing substance dispenser 122 or on the beverage maker 124 for sensing the setting selected by the user on the funnel 120 when the funnel 120 is mounted thereon. Sensor 192a is sensor #1; sensor 192b is sensor #2; sensor 192c is sensor #3; and sensor 192d is sensor #4. As shown in the drawings for this embodiment, these sensors 192a, 192b, 192c, 192d take the form of Hall effect sensors imbedded in the front wall 146 of the brewing substance dispenser 122 or the beverage maker 124 at predetermined positions thereof. Preferably, the centers of the sensors 192a, 192b, 192c, 192d are spaced 0.25" apart from each other and the centers of the magnets 152, 154 are spaced 0.5" apart from each other. The setting on the knob 188 is then wirelessly communicated to the controller of the brewing substance dispenser 122 or to the beverage maker 124, depending on which apparatus the funnel 120 is mounted, to determine a pre-programmed dispensing time, volume or weight. These sensors 192a, 192b, 192c, 192d are coupled to a respective controller which controls the operation of the respective apparatus 122 or 124.

When the funnel 120 is mounted on the brewing substance dispenser 122 or the beverage maker 124, the slide switch assembly 150 aligns with the front wall 146 of the brewing substance dispenser 122 or the beverage maker 124. Depending on the type of beverage and the batch size selected by sliding the slide member 158 along the slot 172, one magnet, for example magnet 154, can align with one of the Hall effect sensors, for example Hall effect sensor 192b. This setting is shown in FIGS. 13–16. The Hall effect sensor 192b senses the presence of the magnet 154 and an appropriate voltage is sent to the controller of the brewing substance dispenser 122 which instructs the brewing substance dispenser 122 to dispense an appropriate amount of beverage of a particular type, such as by grinding, or to the controller of the beverage maker 124 to produce an appropriate amount of beverage, such as by brewing, depending on which component the funnel 120 is mounted. Again, depending on the type of beverage and the batch size selected by sliding the slide member 158 along the slot 172, one magnet 154 can align with one of the Hall effect sensors, for example Hall effect sensor 192c, and the other magnet 152 can align with another one of the Hall effect sensors, for example Hall effect sensor 192a. The Hall effect sensors 192c, 192a sense the presence of the magnets 154, 152 and an appropriate voltage is sent to the controller of the brewing substance dispenser 122 which instructs the brewing substance dispenser 122 to dispense an appropriate amount of coffee of a particular beverage type or to the controller of the beverage maker 124 to produce an appropriate amount of beverage, depending on which component the funnel 120 is mounted.

Figures 15, 16, 17:
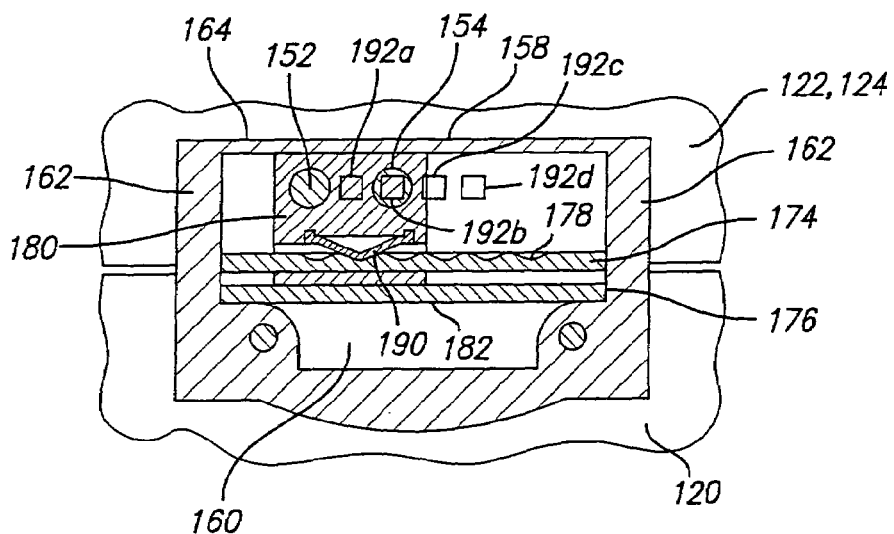
FIG. 15 is a top elevational view of a portion of the funnel and cross-sectional view of a portion of a machine, such as a brewing substance dispenser or coffee grinder, or a beverage maker or coffee brewer, to which the funnel is attached.
FIG. 16 is a cross-sectional view of the funnel and the machine along line 16—16 in FIG. 14.
FIG. 17 is an output chart showing voltages generated under various settings for the embodiment of FIGS. 11–16.

FIG. 17 shows a chart which illustrates the voltages from each sensor 192a, 192b, 192c, 192d which would be sent to the controller depending on which setting is selected by the user. The user simply selects a setting by sliding the slide member 158 until the point on the knob 188 aligns with the desired batch size and type of coffee. Detection of the south polarity of magnet 154 by Hall effect sensor 192a, with magnet 152 not being detected, indicates a small batch of regular coffee has been selected. Detection of the south polarity of magnet 154 by Hall effect sensor 192b, with magnet 152 not being detected, indicates a medium batch of regular coffee has been selected. Detection of the south polarity of magnet 154 by Hall effect sensor 192c and detection of the north polarity of magnet 152 by Hall effect sensor 192a indicates a large batch of regular coffee has been selected. Detection of the south polarity of magnet 154 by Hall effect sensor 192d and detection of the north polarity of magnet 152 by Hall effect sensor 192b indicates a small batch of decaffeinated coffee has been selected. Detection of the north polarity of magnet 152 by Hall effect sensor 192c, with magnet 154 not being detected, indicates a medium batch of decaffeinated coffee has been selected. Detection of the north polarity of magnet 152 by Hall effect sensor 192d, with magnet 154 not being detected, indicates a large batch of decaffeinated coffee has been selected. Detection of the north polarity of magnet 152 by the Hall effect sensors 192a, 192b, 192c, 192d sends a negative going output voltage to the brewing substance dispenser 122 controller or to the beverage maker 124 controller, depending on which component the funnel 120 is mounted; and detection of the south polarity of magnet 154 by the Hall effect sensors 192a, 192b, 192c, 192d sends a positive going output voltage to the brewing substance dispenser 122 controller or to the beverage maker 124 controller, depending on which component the funnel 120 is mounted.

FIG. 18 illustrates a typical schematic diagram of the Hall effect sensor 192a, 192b, 192c, 192d circuitry using commonly available components. As shown in the drawings for this embodiment, the controller would be instructed to process a medium batch of regular coffee. The Hall effect sensor 192b would sense the south polarity of magnet 154 and send a positive voltage to the controller, and Hall effect sensors 192a, 192b, 192c would not sense magnet 152. The controller would then determine, based on this information, that a medium batch of regular coffee has been selected.

If, for example, the slide member 158 were set to select decaffeinated coffee with a small batch size, Hall effect sensor 192d would sense the south polarity of magnet 154 and send a positive voltage to the controller, and Hall effect sensor 192b would sense the north polarity of magnet 152 and send a negative voltage to the controller, and Hall effect sensors 192a, 192c would not sense any magnets. The controller would then determine, based on this combination, that a small batch of decaffeinated coffee has been selected.

If, for example, the slide member 158 were set to select regular coffee with a large batch size, Hall effect sensor 192c would sense the south polarity of magnet 154 and send a positive voltage to the controller, Hall effect sensor 192a would sense the north polarity of magnet 152 and send a negative voltage to the controller, and Hall effect sensors 192b, 192d would not sense any magnets. The controller would then determine, based on this combination, that a large batch of regular coffee has been selected.

FIGS. 19 and 20 show a flow chart illustrating the detection of a large batch of regular coffee. DA in the flow chart represents the programmable number of analog-to-digital converter counts the sensor must be from the center threshold to make the determination as to whether a north or south polarity is being detected. DB in the flow chart represents the programmable number of analog-to-digital converter counts the sensor must be from the adjacent sensor. ST1 represents the static threshold for sensor 192a; ST2 represents the static threshold for sensor 192b; ST3 represents the static threshold for sensor 192c; and ST4 represents the static threshold for sensor 192d. In addition, the flow chart provides logic which senses the position of the magnets 152, 154 relative to the sensors 192a, 192b, 192c, 192d such that if the knob 188 is positioned between two settings, for example, the knob 188 is positioned between a medium batch of regular coffee and a large batch of regular coffee, the software determines which is the appropriate setting. The software determines the position of the magnets 152, 154 relative to the sensors 192a, 192b, 192c, 192d and determines which sensor the magnets are closest to in order to determine the appropriate setting.

In use, the user selects the beverage batch size and type by sliding the slide member 158 along the slot 172 until the associated indicia aligns with the point on the knob 188. The funnel 120 is first mounted on the brewing substance dispenser 122 for the appropriate dispensing, such as by grinding, and then is physically transported to the beverage maker 124 for producing the beverage, such as by brewing. Therefore, information on batch size and the type of beverage is stored in the funnel 120 and is communicated to the brewing substance dispenser 122 and the beverage maker 124 when the funnel 120 is mounted on each. Because the information is carried with the funnel 120, there is no need for an interconnecting cable and therefore, the present system is wireless. The elimination of the cable permits the brewing substance dispenser 122 to serve any number of beverage makers 124. The operation is greatly simplified because only the setting on the knob 188 on the funnel 120 is set; there are no switch settings required on the brewing substance dispenser 122 and no switch settings required on the beverage maker 124.

While the funnel 120 is described as having a six position rotary knob 138 or is described as having a slide switch assembly 150, it is to be understood that the number of positions and the switching mechanism can be varied depending on the application, styling requirements, and the like. For example, a push button arrangement could be used.

The sensors 144a, 144b, 144c; 192a, 192b, 192c, 192d provided in the brewing substance dispenser 122 and the beverage maker 124 can take a variety of forms. The sensors 144a, 144b, 144c; 192a, 192b, 192c, 192d can be effected by any of several different well-known methods of proximity detection, including magnetic, eddy current, capacitance, conductance, photoelectric, inductive, electromagnetic and infrared. In addition, the means 140, 142; 152, 154 on the funnel 120 used to convey the information to the brewing substance dispenser 122 and the beverage maker 124, which is shown in the drawings and is described herein as magnets 140, 142; 152, 154, can take a variety of forms.

The brewing substance dispenser 122 used in the present disclosure is preferably a dual hopper system, which is known in the art, which has regular coffee beans in a first hopper and decaffeinated coffee beans in a second hopper. Depending on which coffee type is selected and the desired batch size, the appropriate hopper is accessed by opening a respective gate provided at the bottom of the hopper to release the appropriate beans and the appropriate amount of beans to a common grinding unit. While a dual hopper brewing substance dispenser 122 is preferably used in the present disclosure, it is understood that a single hopper brewing substance dispenser could be used. In this case, a user would simply select a batch size as only one type of coffee would be available.

In addition, while a separate brewing substance dispenser 122 and a separate beverage maker 124 are preferably used in the present disclosure, a combined brewing substance dispenser and beverage maker unit can be used with the present disclosure. In this situation, the funnel 120 is mounted to the combined unit and is not removed therefrom until after the complete grinding and brewing cycle is completed. The brewing substance dispenser can include a dual hopper or single hopper.

Attention is now invited to FIGS. 21–24. The funnel 220, 220a includes a conductive body 226, 226a having a plastic handle 228, 228a mounted thereon. The body 226, 226a is formed from stainless steel or other suitable conductive material. The handle 228, 228a is mounted on the body 226, 226a by conventional means. The body 226, 226a has a side wall 230, 230a and a bottom wall 232, 232a. The bottom wall 232, 232a has a discharge aperture 233, 233a therethrough. The upper end of the body 226, 226a is open.

A plastic housing 234, 234a is mounted on the uppermost end of the handle 228, 228a and extends upwardly therefrom and from the uppermost end of the body 226, 226a. The housing 234, 234a does not overlap the open end of the body 226, 226a. A memory device 236, 236a, such as a semiconductor memory chip, is attached to or implanted into the housing 234, 234a.

Figure 21:
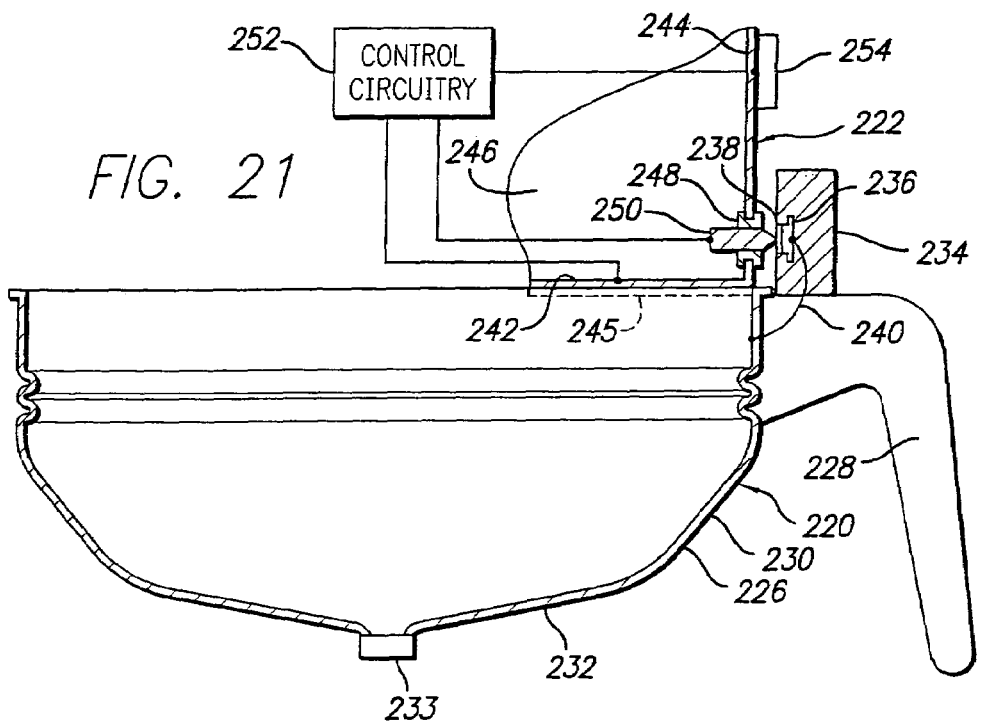
FIG. 21 is a partial fragmentary side elevational view of a funnel, with a fragmentary portion of the funnel being shown in cross-section, and a cross-sectional view of a portion of a brewing substance dispenser, such as a coffee grinder, to which the funnel is attached which incorporates the features of another embodiment of the disclosure.
Figure 22:
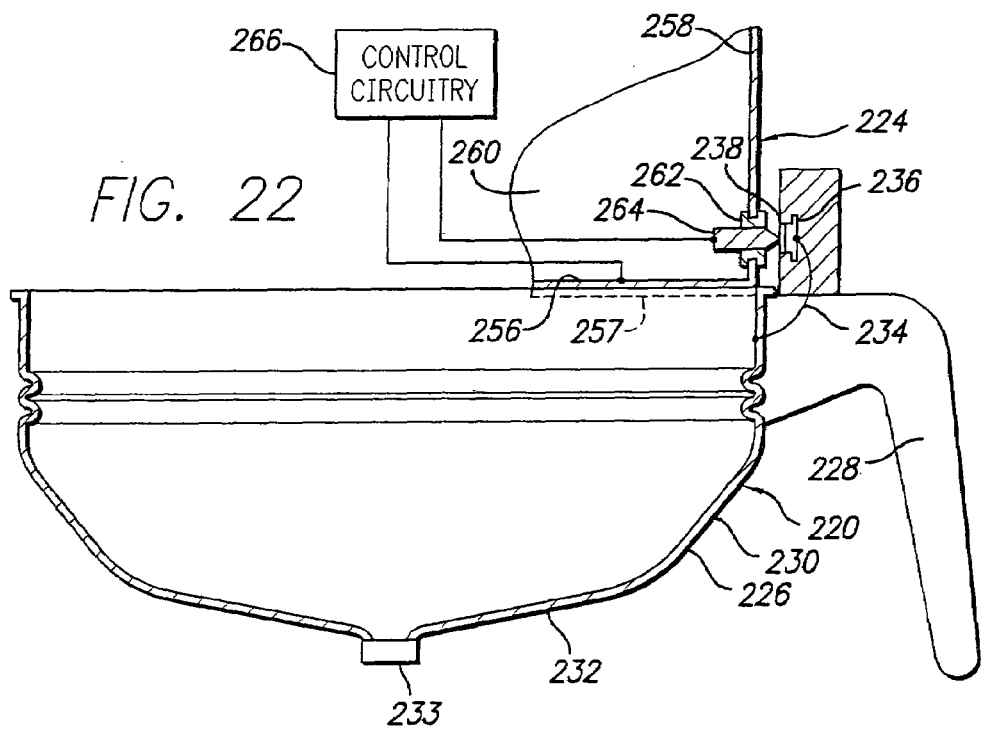
FIG. 22 is a partial fragmentary side elevational view of the funnel of FIG. 21, with a fragmentary portion of the funnel being shown in cross-section, and a cross-sectional view of a portion of a beverage maker, such as a coffee brewer, to which the funnel is attached which incorporates the features of another embodiment of the disclosure.

Attention is invited to another embodiment of the present disclosure as shown in FIGS. 21 and 22.

The memory device 236 is implanted in the housing 234 such that a face 238 of the memory device 236 is exposed on the side of the housing 234 proximate to the body 226 of the funnel 220. The memory device 236 is electrically coupled to the metal body 226 of the funnel 220 by a ground strip 240. The ground strip 240 extends through the housing 234 and through an upper portion of the handle 228. An example of a suitable memory device 236 is an Electrically Erasable Programmable Read Only Memory (EEPROM) sold under the trademark "iButton™" and manufactured by Dallas Semiconductor. The "iButton™" EEPROM is a memory chip packaged in a sealed can. The "iButton™" EEPROM carries power and data on a single wire plus a ground return.

As shown in FIG. 21, the brewing substance dispenser 222, such as coffee grinder, has a metal bottom wall 242, a metal front wall 244, opposite side walls 246 (only one of which is shown), and a top wall (not shown). A pair of conductive funnel mounting rails 245 (only one of which is shown in phantom line) are provided on the bottom wall 242. The rails 245 are formed from stainless steel or other suitable conductive material. The front wall 244 has an aperture provided therethrough. An insulator 248, formed of suitable non-conductive material, is mounted within the aperture. The insulator 248 has an aperture through its center. A metal contact 250 is mounted within the aperture through the insulator 248 and is secured thereto by suitable means. A portion of the metal contact 250 extends outwardly from the front wall 244. Control circuitry 252 is provided within the brewing substance dispenser 222 and is coupled to the metal contact 250 and to the bottom wall 256 of the brewing substance dispenser 222. The control circuitry 252 includes a memory therein. A user interface 254, which can take many forms such as depressible buttons, a touch pad, movable switches, and the like, is provided on the front wall 244. The user interface 254 is coupled to the control circuitry 252. Beverage recipes, such as recipes for coffee, are stored in the memory of the control circuitry 252. Each recipe includes information on beverage type, batch size, percent bypass water, pulse brew initial on-time, pulse brew off-time, and pulse brew remaining on-times.

As shown in FIG. 22, the beverage maker 224, such as a coffee brewer, has a metal bottom wall 256, a metal front wall 258, opposite side walls 160 (only one of which is shown), and a top wall (not shown). A pair of conductive funnel mounting rails 257 (only one of which is shown in phantom line) are provided on the bottom wall 256. The rails 257 are formed from stainless steel or other suitable conductive material. The front wall 258 has an aperture provided therethrough. An insulator 262, formed of a suitable non-conductive material, is mounted within the aperture. The insulator 262 has an aperture through its center. A metal contact 264 is mounted within the aperture through the insulator 262 and is secured thereto by suitable means. A portion of the metal contact 264 extends outwardly from the front wall 258. Control circuitry 266 is provided within the beverage maker 224 and is coupled to the metal contact 264 and to the bottom wall 156 of the beverage maker 224. The control circuitry 266 includes a memory therein.

In use, the user selects the appropriate recipe by using the user interface 254 on the brewing substance dispenser 222. This information is transmitted to the control circuitry 252. The funnel 220 is mounted on the rails 245 of the brewing substance dispenser 222 such that the upper end of the body 226 contacts the rails 245, the housing 234 is proximate to the front wall 244 and the body 226 is underneath the bottom wall 242. An upper end of the body 226 may contact the bottom wall 242. The memory device 236 within the housing 234 is positioned such that it is proximate to and contacts the portion of the metal contact 250 which protrudes outwardly from the front wall 244. The metal-to-metal contact between the funnel 220 and the brewing substance dispenser 222, provided as a result of the metal body 226 of the funnel 220 contacting the metal rails 245 of the brewing substance dispenser 222, provides the ground return to the control circuitry 252. The control circuitry 252 instructs the appropriate components of the brewing substance dispenser 222 to dispense the appropriate amount and type of beverage, such as by grinding an appropriate amount and type of coffee. As the brewing substance dispenser 222 dispenses beverage into the funnel 220, the control circuitry 252 in the brewing substance dispenser 222 transmits recipe information to the memory device 236 in the funnel 220 via the contact 250.

Thereafter, the funnel 220 is removed from the brewing substance dispenser 222 and transported to the beverage maker 224. The funnel 220 is mounted on the rails 257 of the beverage maker 224 such that the upper end of the body 226 contacts the rails 257, the housing 234 is proximate to the front wall 258 and the body 226 is underneath the bottom wall 256. An upper end of the body 226 may contact the bottom wall 256. The memory device 236 is positioned such that it is proximate to and contacts the portion of the metal contact 264 which protrudes outwardly from the front wall 258. The information stored in the memory device 236 of the funnel 220 regarding beverage batch size and/or type is read by the control circuitry 266 of the beverage maker 224. At this point, depending on user preference, the remaining information is read either from the memory device 236 in the funnel 220 or from internal beverage maker memory. The metal-to-metal contact between the funnel 220 and the rails 257 of the beverage maker 224, provided as a result of the metal body of the funnel 220 contacting the metal rails 257 of the beverage maker 224, provides the ground return to the control circuitry 266. The control circuitry 266 instructs the appropriate components of the beverage maker 224 to produce the desired beverage, such as by brewing the coffee.

Figure 23:
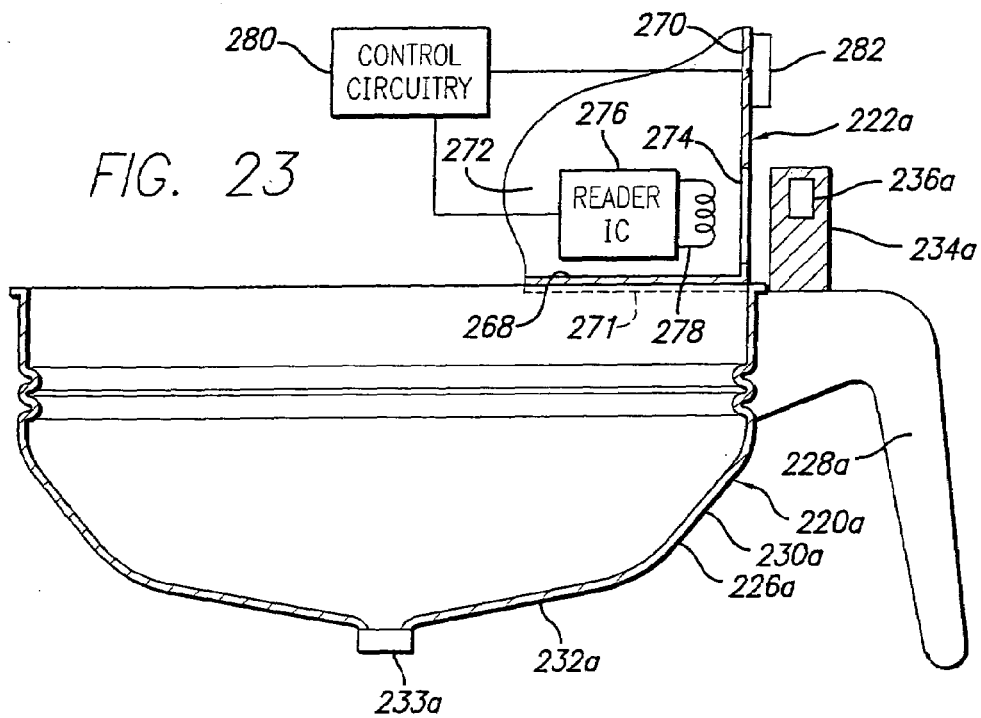
FIG. 23 is a partial fragmentary side elevational view of a funnel, with a fragmentary portion of the funnel being shown in cross-section, and a cross-sectional view of a portion of a brewing substance dispenser, such as a coffee grinder, to which the funnel is attached which incorporates the features of another embodiment of the disclosure.
Figure 24:
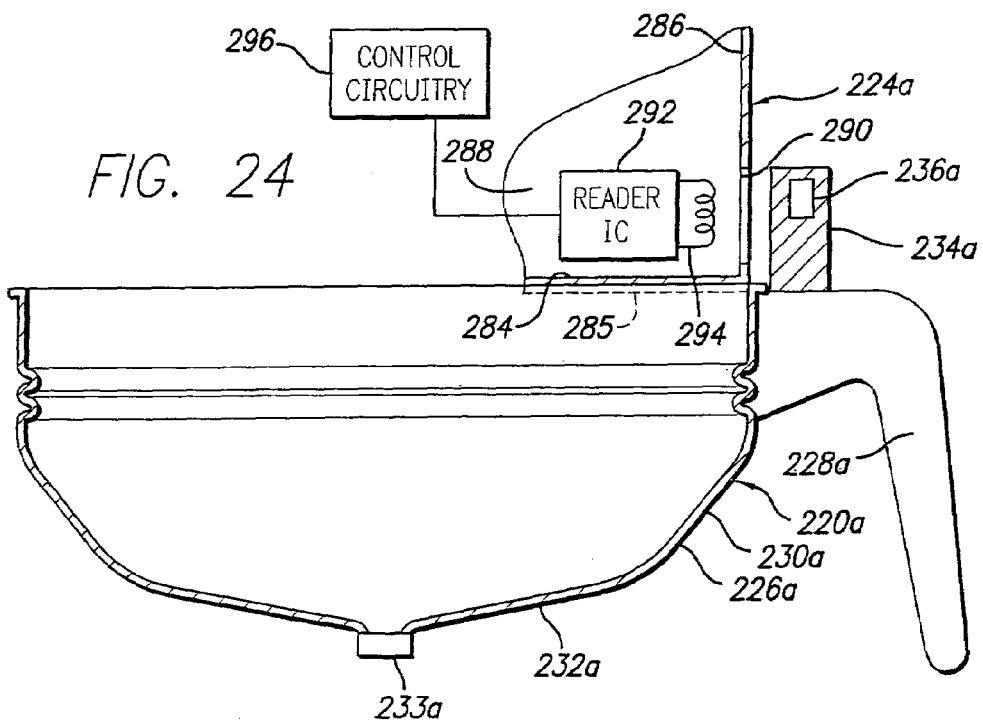
FIG. 24 is a partial fragmentary side elevational view of the funnel of FIG. 23, with a fragmentary portion of the funnel being shown in cross-section, and a cross-sectional view of a portion of a beverage maker or brewer, such as a coffee brewer, to which the funnel is attached.

Attention is invited to the embodiment of the present disclosure as shown in FIGS. 23 and 24.

The memory device 236a is implanted in the housing 234a such that it is encapsulated within the housing 234a. An example of a suitable memory device 236a is an RFID device manufactured by Temic. This type of device transfers information by electromagnetic coupling and does not require an electrical contact to transfer information.

As shown in FIG. 23, the brewing substance dispenser 222a, such as coffee grinder, has a metal bottom wall 268, a metal front wall 270, opposite side walls 272 (only one of which is shown) and a top wall (not shown). A pair of funnel mounting rails 271 (only one of which is shown in phantom line) are provided on the bottom wall 270. The rails 271 may be formed from stainless steel or other suitable conductive material. The front wall 270 has an aperture provided therethrough. A plastic insert 274, which is transparent to electromagnetic energy, is mounted within the aperture. A reader integrated circuit 276 having a reader coil 278 is mounted within the brewing substance dispenser 222a. The reader coil 278 is proximate to the plastic insert 274. Control circuitry 280 is provided within the brewing substance dispenser 222a and is coupled to the reader integrated circuit 276. The control circuitry 280 includes a memory therein. A user interface 282, which can take many forms such as depressible buttons, a touch pad, movable switches, and the like, is provided on the front wall 270. The user interface 282 is coupled to the control circuitry 280. Beverage recipes, such as coffee recipes, are stored in the memory of the control circuitry 280. Each recipe includes information on beverage type, batch size, percent bypass water, pulse brew initial on-time, pulse brew off-time, and pulse brew remaining on-times.

As shown in FIG. 24, the beverage maker 224a, such as a coffee brewer, has a metal bottom wall 284, a metal front wall 286, opposite side walls 288 (only one of which is shown) and a top wall (not shown). A pair of funnel mounting rails 285 (only one of which is shown in phantom line) are provided on the bottom wall 284. The rails 285 may be formed from stainless steel or other suitable conductive material. The front wall 286 has an aperture provided therethrough. A plastic insert 290, which is transparent to electromagnetic energy, is mounted within the aperture. A reader integrated circuit 292 having a reader coil 294 is mounted within the beverage maker 224a. The reader coil 294 is proximate to the plastic insert 290. Control circuitry 296 is provided within the beverage maker 224a and is coupled to the reader integrated circuit 292. The control circuitry 296 includes a memory therein.

In use, the user selects the appropriate recipe by using the user interface 282 on the brewing substance dispenser 222a. This information is transmitted to the control circuitry 280. The funnel 220a is mounted on the brewing substance dispenser 222a such that the housing 234a is proximate to the front wall 270 and the body 226a is underneath the bottom wall 268 and an upper end of the body 226a contacts the bottom wall 268. The memory device 236a is positioned such that it is proximate to the plastic insert 274 in the front wall 270 of the brewing substance dispenser 222a. The control circuitry 280 instructs the appropriate components of the brewing substance dispenser 222a to dispense the appropriate amount and type of beverage, such as by grinding the appropriate amount and type of coffee. As the brewing substance dispenser 222a dispenses beverage into the funnel 220a, the control circuitry 280 in the brewing substance dispenser 222a transmits recipe information to the memory device 236a in the funnel 220a via the reader integrated circuit 276 and the reader coil 278.

Thereafter, the funnel 220a is removed from the brewing substance dispenser 222a and transported to the beverage maker 224a. The funnel 220a is mounted on the beverage maker 224a such that the housing 234a is proximate to the front wall 286 and the body 226a is underneath the bottom wall 284 and an upper end of the body 226a contacts the bottom wall 284. The memory device 236a is positioned such that it is proximate to the plastic insert 290. The information stored in the memory device 236a of the funnel 220a regarding beverage batch size and/or type is read by the control circuitry 296 of the beverage maker 224a. At this point, depending on user preference, the remaining information is read either from the memory device 236a in the funnel 220a or from internal beverage maker memory. The control circuitry 296 instructs the appropriate components of the beverage maker 224a to produce the desired beverage, such as by brewing coffee.

Some restaurants or institutions may want the recipe stored only in the memory device 236, 236a in the funnel 220, 220a so that a corporate office can make a change throughout their entire organization by sending preprogrammed memory devices 236, 236a to all of their stores. Other customers may want the flexibility to modify the recipe at the store level. If the latter option is desired, the recipes can be stored in the beverage maker memory so that the recipes can be easily changed using controls within the beverage maker 224, 224a itself It is possible to have a combination of the two options such that some "protected" recipes are stored in the memory device 236, 236a of the funnel 220, 220a which the users cannot modify and some "changeable" recipes are stored in the beverage maker memory which can be changed by the user.

Because the information is carried with the funnel 220, 220a there is no need for an interconnecting cable. The elimination of the cable permits the brewing substance dispenser 222, 222a to serve any number of beverage makers 224, 224a. The operation is greatly simplified because only the setting on the brewing substance dispenser 222, 222a is set; there are no switch settings required on the beverage maker 224, 224a or the funnel 220, 220a.

While specific components are shown and described for use in transmitting information between the brewing substance dispenser 222, 222a and the funnel 220, 220a, and for transmitting information between the beverage maker 224, 224a and the funnel 220, 220a, and for storing the information within the funnel 220, 220a, it is to be understood other components are within the scope of the disclosure so long as a cable is not needed to connect the brewing substance dispenser 222, 222a and the funnel 220, 220a or to connect the beverage maker 224, 224a and the funnel 220, 220a.

The brewing substance dispenser 222, 222a used in the present disclosure is preferably a dual hopper system, which is known in the art, which has regular coffee beans in a first hopper and decaffeinated coffee beans in a second hopper, or two different flavored coffees in the respective hoppers. Depending on which coffee type is selected and the desired batch size, the appropriate hopper is accessed by opening a respective gate provided at the bottom of the hopper to release the appropriate beans and the appropriate amount of beans to a common grinding unit. While a dual hopper brewing substance dispenser 222, 222a is preferably used in the present disclosure, it is understood that a single hopper brewing substance dispenser could be used.

In addition, while the present disclosure is described with respect to grinding and brewing coffee, it is within the scope of the disclosure that this system and method can be used to brew, dilute, reconstitute, mix and the like, coffee, tea, powdered beverages and the like.

While embodiments of the present disclosure are shown and described, it is envisioned that those skilled in the art may devise various modifications and equivalents without departing from the spirit and scope of the disclosure as recited in the following claims.

I claim:

1. A beverage preparation system for preparing a beverage comprising:
    a beverage preparation apparatus for producing a beverage;
    the beverage preparation apparatus including a controller for controlling production of a beverage by the beverage preparation apparatus;
    a storage device for carrying transferable information relating to at least one of beverage preparation parameter information, non-beverage information and beverage information;
    the storage device being separate from the beverage preparation apparatus;
    a communication device for receiving the transferable information from the storage device;
    the communication device being coupled to the controller;
    the communication device transmitting the transferable information from the storage device to the controller.

2. The beverage preparation system of claim 1, wherein the communication device is carried on the beverage preparation apparatus.

3. The beverage preparation system of claim 1, wherein the communication device is couplable with the storage device for one way communication from the storage device to the communication device.

4. The beverage preparation system of claim 1, further comprising a programming device for programming the storage device.

5. The beverage preparation system of claim 1, wherein the storage device is an electrical device for storing the transferable information in an electrical form and the communication device being an electrical device reader for receiving and transmitting the transferable information from the storage device to the controller.

6. The beverage preparation system of claim 5, wherein the electrical device is conductively couplable with the electrical device reader.

7. The beverage preparation system of claim 5, wherein the electrical device is inductively couplable with the electrical device reader.

8. The beverage preparation system of claim 1, wherein the storage device is a transponder component for storing the transferable information and the communication device is a transponder component reader for receiving and transmitting the transferable information from the storage device to the controller.

9. The beverage preparation system of claim 1, wherein the storage device is a magnetic device for storing the transferable information in a magnetic form and the communication device is a magnetic device reader for receiving and transmitting the transferable information from the storage device to the controller.

10. The beverage preparation system of claim 1, wherein the storage device is a bar code for storing the transferable information and the communication device is a bar code reader for receiving and transmitting the transferable information from the storage device to the controller.

11. The beverage preparation system of claim 1, wherein the storage is a vehicle and a code on the vehicle for storing the transferable information in printed form and the communication device is a manual code inputting device for receiving and transmitting the transferable information from the storage device to the controller.

12. The beverage preparation system of claim 1, wherein the apparatus includes:
    a memory device coupled to the controller for storing at least one of beverage preparation parameters, groups of beverage preparation parameters and parameters relating to at least one recipe for beverage preparation;

the storage device being a vehicle;

a code carried on the vehicle;

the code being in a printed form and relating to the at least one of beverage preparation parameters, groups of beverage preparation parameters and parameters relating to at least one recipe for beverage preparation; and the communication device being a manual code inputting device for receiving and transmitting the code from the storage device to the controller.

13. The beverage preparation system of claim 1, wherein the storage device is an acoustic delivery device for providing the transferable in an acoustical form and the communication device is an acoustical signal receiving device for receiving and transmitting the transferable information from the storage device to the controller.

14. The beverage preparation system of claim 1, wherein the beverage preparation device is a beverage brewer.

15. The beverage preparation system of claim 1, wherein the beverage preparation device is a beverage reconstituting device.

16. The beverage preparation system of claim 15, wherein the beverage reconstituting device reconstitutes a powdered beverage concentrate.

17. The beverage preparation system of claim 15, wherein the beverage reconstituting device reconstitutes a liquid beverage concentrate.

18. The beverage preparation system of claim 1, further comprising a sensory output device positioned at least proximate to the beverage preparation apparatus;

the sensory output device being coupled to the controller;

the storage device carrying transferable sensory output information; and the sensory output device producing a sensory output from the sensory output information.

19. The beverage preparation system of claim 18, wherein the sensory output device is a visual display.

20. The beverage preparation system of claim 18, wherein the sensory output device is an auditory display.

21. The beverage preparation system of claim 18, wherein the sensory output information includes at least one of non-beverage information and beverage information.

22. The beverage preparation system of claim 18, wherein the sensory output information is advertising information.

23. The beverage preparation system of claim 1, wherein the communication device is coupled to the storage device for two way communication from the storage device to the communication device and from the communication device to the storage device.

24. The beverage preparation system of claim 23, further comprising a memory device coupled to the controller for collecting information relating to operation of the beverage apparatus; the storage device being a writeable device for receiving information; and selectively transmitting information from the memory device to the storage device.

25. A method of producing a beverage comprising the steps of:

providing a funnel having a definable selector for setting an indication of preparation parameters thereon;

introducing a quantity of beverage making substance into the funnel;

providing a beverage maker having at least one sensor for sensing the selector, the selector and the at least one sensor being in communication with each other when the funnel is positioned proximate to the beverage maker;

defining preparation parameters on the selector;

positioning the funnel proximate to the beverage maker;

the at least one sensor sensing the preparation parameters;

dispensing preparation liquid into the funnel for combination with the beverage making substance in the funnel based on the preparation parameters; and producing a beverage.

26. The method of producing a beverage as set forth in claim 25, further comprising:

the selector and the at least one sensor being in wireless communication with each other when the funnel is positioned proximate to the beverage maker.

27. A method of producing a beverage comprising the steps of:

providing a funnel having a memory device therein, the memory device having information regarding preparation parameters for producing a beverage therein;

providing a beverage maker having means for reading the memory device of the funnel;

providing the beverage maker with a component for controllably delivering a preparation liquid to the funnel;

providing a brewing substance in the funnel for producing a beverage;

positioning the funnel proximate to the beverage maker and the means for reading the memory device such that the preparation parameters for producing a beverage are transmitted to the beverage maker; and combining the brewing substance with preparation liquid in the funnel based on the preparation parameters to produce a beverage.

28. A beverage brewer and brew funnel combination comprising:

the brewer comprising a housing and at least one sensor carried on the housing; and the brew funnel comprising a body and a definable selector for setting an indication of preparation parameters thereon, the at least one sensor and the definable selector being in wireless communication with each other when the brew funnel is positioned proximate to the brewer.

29. A beverage maker and a funnel combination comprising:

the funnel comprising a body and a memory device therein, the memory device having information regarding preparation parameters for producing a beverage therein; and the beverage maker comprising a housing and means for reading the memory device of the funnel, the means for reading and the memory device capable of being in communication with each other such that information regarding the preparation parameters for producing a beverage is transmitted to the beverage maker.

30. The beverage preparation system of claim 1, the beverage preparation apparatus further comprising a beverage dispenser for receiving beverage produced by the beverage preparation apparatus, the beverage dispenser including a dispenser controller, a dispenser memory device coupled to the controller and a sensory output device coupled to the controller, the dispenser controller receiving transferable information from the beverage preparation apparatus and moving the transferable information in the memory device for at least one of elective use in controlling the beverage dispenser and for selective display on the dispenser sensory display.

31. The beverage preparation system of claim 30, wherein the beverage dispenser is selectively displaceable from the beverage preparation apparatus and the transferable information transmitted from the beverage preparation apparatus to the beverage dispenser is selectively usable for controlling the beverage dispenser and selectively displayable on the dispenser sensory display when the dispenser is displaced from the beverage preparation apparatus.

32. A method of producing a beverage comprising the steps of:
providing a funnel having a memory device thereon;
providing a dispenser having a user interface and means for storing and transmitting information;
selecting preparation parameters using the user interface;
mounting the funnel on the dispenser;
transmitting information regarding the preparation parameters from the means in the dispenser to the memory device in the funnel;
dispensing a brewing substance into the funnel; and
dispensing a preparation liquid into the funnel to produce a beverage.

33. The method as defined in claim 32, wherein the means and the memory device are in wireless communication with each other.

34. The method as defined in claim 32, wherein the means comprises a contact which extends outwardly from the dispenser and is couplable with the memory device when the funnel is mounted on the dispenser.

35. The method as defined in claim 32, wherein the means comprises integrated circuit means and further including an insert in the dispenser through which information is transmitted from the integrated circuit means to the memory device in the funnel.

36. The method as defined in claim 32, wherein the memory device is an EEPROM.

37. The method as defined in claim 32, wherein the memory device is an RFID.

38. A method of producing a beverage comprising the steps of:
providing a funnel having a memory device thereon;
providing a dispenser having a user interface and means for storing and transmitting information;
selecting a desired recipe for producing a beverage by using the user interface;
mounting the funnel on the dispenser;
transmitting information regarding the recipe from the means in the dispenser to the memory device in the funnel;
dispensing a brewing substance into the funnel;
removing the funnel from the dispenser;
providing a beverage maker having means for reading the memory device of the funnel;
mounting the funnel on the beverage maker, the beverage maker means reading the memory device such that information regarding the recipe for producing a beverage is transmitted to the beverage maker; and
producing a beverage.

39. The method as defined in claim 38, wherein when the funnel is mounted on the dispenser, the means of the dispenser and the memory device are in wireless communication with each other, and when the funnel is mounted on the beverage maker, the means of the beverage maker and the memory device are in wireless communication with each other.

40. The method as defined in claim 38, wherein the means on the dispenser comprises a contact which extends outwardly from the dispenser and is couplable with the memory device when the funnel is mounted on the dispenser, and the means on the beverage maker comprises a contact which extends outwardly from the beverage maker and is couplable with the memory device when the funnel is mounted on the beverage maker.

41. The method as defined in claim 38, wherein when the funnel is mounted on the dispenser, an electrical connection is solely formed between the contact, the memory device, a ground strip coupled between the memory device and a body of the funnel, and the dispenser, and wherein when the funnel is mounted on the beverage maker, an electrical connection is solely formed between the contact, the memory device, a ground strip coupled between the memory device and a body of the funnel, and the beverage maker.

42. The method as defined in claim 38, wherein the means on the dispenser comprises integrated circuit means and further including an insert in the dispenser through which information is transmitted from the integrated circuit means to the memory device in the funnel, and wherein the means on the beverage maker comprises integrated circuit means and further including an insert in the beverage maker through which information is transmitted from the memory device in the funnel to the integrated circuit means in the beverage maker.

43. The method as defined in claim 38, wherein the memory device is an EEPROM.

44. The method as defined in claim 38, wherein the memory device is an RFID.

45. The beverage preparation system of claim 1, wherein the storage device is an RFID.

46. The beverage preparation system of claim 1, wherein the storage device is an EEPROM.

47. The beverage preparation system of claim 1, including a funnel for retaining a quantity of beverage preparation substance, the storage device being operatively associated with the funnel.

48. The beverage preparation system of claim 1, the storage device is carried on the funnel.

* * * * *